US008806364B2

(12) United States Patent
Hwang

(10) Patent No.: US 8,806,364 B2
(45) Date of Patent: Aug. 12, 2014

(54) MOBILE TERMINAL WITH TOUCH SCREEN AND METHOD OF PROCESSING DATA USING THE SAME

(75) Inventor: Hoyoung Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 12/419,481

(22) Filed: Apr. 7, 2009

(65) Prior Publication Data

US 2010/0122195 A1 May 13, 2010

(30) Foreign Application Priority Data

Nov. 13, 2008 (KR) ........................ 10-2008-0112617

(51) Int. Cl.
G06F 3/048 (2013.01)
G06F 3/0481 (2013.01)
(52) U.S. Cl.
CPC .................................. G06F 3/0481 (2013.01)
USPC ............ 715/790; 715/788; 715/798; 715/799
(58) Field of Classification Search
USPC ......................... 715/769, 788, 790, 798, 799
See application file for complete search history.

(56) References Cited

U.S. PATENT DOCUMENTS

| 5,305,435 | A | * | 4/1994 | Bronson | ........................ 715/777 |
| 5,406,307 | A | * | 4/1995 | Hirayama et al. | ............ 715/800 |
| 5,603,053 | A | * | 2/1997 | Gough et al. | ...................... 710/5 |
| 5,657,049 | A | * | 8/1997 | Ludolph et al. | ................ 715/856 |
| 5,664,128 | A | * | 9/1997 | Bauer | ............................ 715/708 |
| 5,745,096 | A | * | 4/1998 | Ludolph et al. | ................ 715/764 |
| 5,754,179 | A | * | 5/1998 | Hocker et al. | ................. 715/835 |
| 5,821,930 | A | * | 10/1998 | Hansen | .......................... 715/702 |
| 5,920,313 | A | * | 7/1999 | Diedrichsen et al. | .......... 715/767 |
| 5,995,155 | A | * | 11/1999 | Schindler et al. | .............. 348/461 |
| 6,011,550 | A | * | 1/2000 | Capps et al. | .................... 715/788 |
| 6,473,102 | B1 | * | 10/2002 | Rodden et al. | ................. 715/788 |
| 6,545,687 | B2 | * | 4/2003 | Scott et al. | ..................... 345/629 |
| 6,760,048 | B1 | * | 7/2004 | Bates et al. | .................... 715/797 |
| 6,823,494 | B2 | * | 11/2004 | Minoura et al. | .............. 715/800 |

(Continued)

FOREIGN PATENT DOCUMENTS

WO  WO 2008/090902       *  7/2008
              A10

OTHER PUBLICATIONS

Johns, "iChat Information Pages—Sending Files," May 21, 2008, http://web.archive.org/web/20080521111939/http://www.ralphjohns.co.uk/page7.html.*

(Continued)

Primary Examiner — Ryan Pitaro
Assistant Examiner — Ryan Barrett
(74) Attorney, Agent, or Firm — Birch, Stewart, Kolasch & Birch, LLP

(57) ABSTRACT

A method of controlling a mobile terminal, and which includes displaying a data list including at least one data item in a display window of a touch screen on the terminal, displaying at least one icon corresponding to a first application that is executed by the terminal, displaying a graphic user interface (GUI) corresponding to the first application on the display window of the touch screen as the icon is touched and dragged on the touch screen, and controlling at least one of a position and a size of the displayed data list such that a region where the GUI is displayed and a region where the data list is displayed are not overlapped with each other when the GUI is displayed as the icon is touched and dragged on the touch screen.

12 Claims, 27 Drawing Sheets

(56) References Cited

U.S. PATENT DOCUMENTS

| | | | |
|---|---|---|---|
| 7,304,638 B2* | 12/2007 | Murphy | 345/173 |
| 7,370,284 B2* | 5/2008 | Andrea et al. | 715/788 |
| 7,779,365 B2* | 8/2010 | Fujita | 715/788 |
| 7,802,206 B1* | 9/2010 | Davis et al. | 715/864 |
| 8,065,629 B1* | 11/2011 | Ragan | 715/799 |
| 2001/0028365 A1* | 10/2001 | Ludolph | 345/764 |
| 2003/0179234 A1* | 9/2003 | Nelson et al. | 345/764 |
| 2004/0100497 A1* | 5/2004 | Quillen et al. | 345/751 |
| 2004/0261037 A1* | 12/2004 | Ording et al. | 715/788 |
| 2006/0010217 A1* | 1/2006 | Sood | 709/206 |
| 2007/0083827 A1* | 4/2007 | Scott et al. | 715/811 |
| 2007/0174782 A1* | 7/2007 | Russo | 715/781 |
| 2007/0226650 A1* | 9/2007 | Hintermeister et al. | 715/822 |
| 2007/0266319 A1 | 11/2007 | Matsuo | |
| 2009/0122018 A1* | 5/2009 | Vymenets et al. | 345/173 |
| 2009/0210820 A1* | 8/2009 | Adachi et al. | 715/786 |
| 2009/0315867 A1* | 12/2009 | Sakamoto et al. | 345/184 |
| 2010/0088634 A1* | 4/2010 | Tsuruta et al. | 715/800 |

OTHER PUBLICATIONS

Mozilla, "Test Case Matrix for Drag & Drop," Jan. 30, 2002, http://web.archive.org/web/20020130220308/http ://www.mozilla.org/quality/browser/front-end/testcases/drag-drop/.*

* cited by examiner

MOBILE TERMINAL WITH TOUCH SCREEN AND METHOD OF PROCESSING DATA USING THE SAME

The present application claims priority to Korean Application No. 10-2008-0112617 filed in Korea on Nov. 13, 2008, the entire contents of which are hereby incorporated by reference in their entirety.

BACKGROUND OF THE INVENTION

1. Field of the Invention

The present invention relates to a mobile terminal with a touch screen, which enables fast access between an application and data or between applications without searching a menu layer, and a method of processing data using the same.

2. Discussion of the Related Art

Terminals such as personal computers, laptop computers, cellular phones and the like now include a variety of features such as multimedia functions including the ability to capture pictures or moving images, play music, arrange image files, play games, receive broadcasting programs, etc.

Generally, terminals can be divided into mobile terminals and stationary terminals. Further, mobile terminals can be classified into handheld terminals and vehicle mounted terminals, for example.

Because mobile terminals now provide a variety of functions, the user interface includes a complicated menu structure that the user has to search through to access any one or more of the functions. The mobile terminals also have small display screens so it is difficult to provide various functions that can be easily accessed by the user. The complicated menu structure inconveniences the user.

SUMMARY OF THE INVENTION

Accordingly, one object of the present invention is to address the above-noted and other drawbacks of the related art.

Another object of the present invention is to provide a mobile terminal having a touch screen and corresponding method for enabling rapid access between an application and data or between applications without searching a menu layer.

Yet another object of the present invention is to provide a mobile terminal having a touch screen and corresponding method for allowing a user to access data that can be used for video telephony in the mobile terminal easily and rapidly without searching a menu layer.

Still another object of the present invention is to provide a mobile terminal having a touch screen and corresponding method for allowing the input of required data while minimizing the number of times of searching a menu layer or the number of user's inputs through a keyboard when a message is transmitted.

Another object of the present invention is to provide a mobile terminal having a touch screen and corresponding method for performing convenient web browsing while eliminating or minimizing user input required for web browsing.

To accomplish the objects of the present invention, according to an aspect of the present invention, there is provided a method of processing data in a mobile terminal with a touch screen, and which includes displaying a data list including at least one data item on the touch screen, displaying a graphic user interface (GUI) corresponding to a first application on a portion of the touch screen, and controlling at least one of a position and a size of the displayed data list such that the region where the GUI is displayed and the region where the data list is displayed are not overlapped with each other when the GUI is displayed.

To accomplish the objects of the present invention, according to another aspect of the present invention, there is provided a mobile terminal including a touch screen, a memory storing at least one application and at least one data list including at least one data item, and a controller displaying a data list including at least one data item on the touch screen, displaying a GUI corresponding to a first application on a portion of the touch screen and controlling at least one of a position and a size of the displayed data list such that the region where the GUI is displayed and the region where the data list is displayed are not overlapped with each other when the GUI is displayed.

Further, the mobile terminal and corresponding method according to an embodiment of the present invention enables rapid access between data and an application or between applications without searching a menu layer. In addition, the mobile terminal can transmit data to a receiving part easily and rapidly without searching the menu layer in video telephony.

Moreover, an embodiment of the present invention can allow a user to input data such as information on a receiving part, attachment, message contents, etc. easily and conveniently while minimizing search of the menu layer or user's input through a keyboard when a message is transmitted through the mobile terminal.

In addition, an embodiment of the present invention can perform web browsing conveniently while eliminating or minimizing user input required for web browsing (for example, input of a web connecting route or input of a search keyword) in the mobile terminal.

To achieve these and other advantages and in accordance with the purpose of the present invention, as embodied and broadly described herein, the present invention provides in one aspect a method of controlling a mobile terminal, and which includes displaying a data list including at least one data item in a display window of a touch screen on the terminal, displaying at least one icon corresponding to a first application that is executed by the terminal, displaying a graphic user interface (GUI) corresponding to the first application on the display window of the touch screen as the icon is touched and dragged on the touch screen, and controlling at least one of a position and a size of the displayed data list such that a region where the GUI is displayed and a region where the data list is displayed are not overlapped with each other when the GUI is displayed as the icon is touched and dragged on the touch screen.

In another aspect, the present invention provides a mobile terminal including a display unit configured to display a data list including at least one data item one a display window of a touch screen on the terminal, to display at least one icon corresponding to a first application that is executed by the terminal, and to display a graphic user interface (GUI) corresponding to the first application on the display window of the touch screen as the icon is touched and dragged on the touch screen, and a controller configured to control at least one of a position and a size of the displayed data list on the display unit such that a region where the GUI is displayed and a region where the data list is displayed are not overlapped with each other when the GUI is displayed as the icon is touched and dragged on the touch screen.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
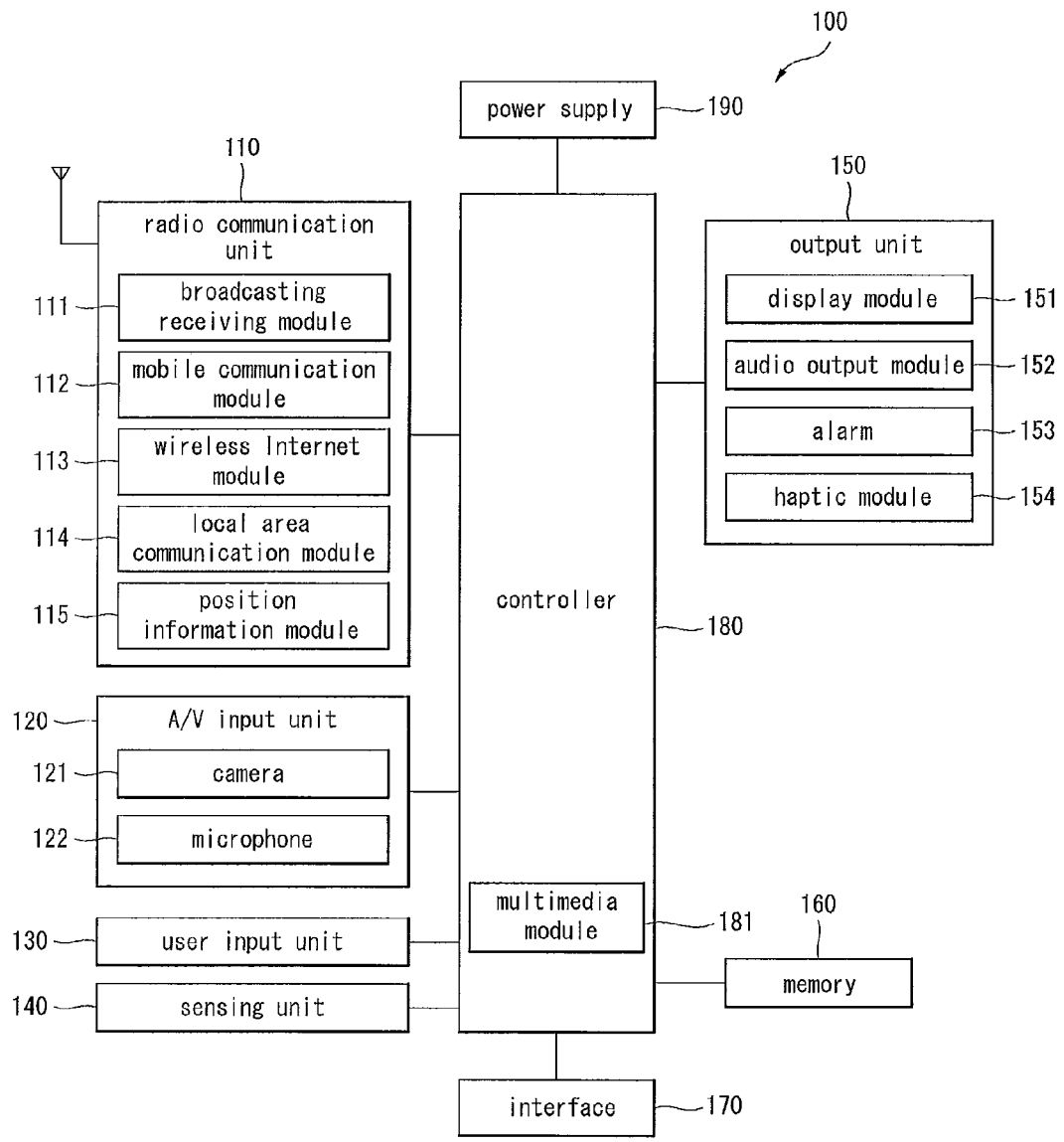
FIG. 1 is a block diagram of a mobile terminal according to an embodiment of the present invention.

FIG. 1 is a block diagram of a mobile terminal 100 according to an embodiment of the present invention. As shown, the mobile terminal 100 includes a radio communication unit 110, an audio/video (A/V) input unit 120, a user input unit 130, a sensing unit 140, an output unit 150, a memory 160, an interface 170, a controller 180, and a power supply 190.

In addition, the radio communication unit 110 includes at least one module that enables radio communication between the mobile terminal 100 and a radio communication system or between the mobile terminal 100 and a network in which the mobile terminal 100 is located. For example, the radio communication unit 110 includes a broadcasting receiving module 111, a mobile communication module 112, a wireless Internet module 113, a local area communication module 114 and a position information module 115.

The broadcasting receiving module 111 receives broadcasting signals and/or broadcasting related information from an external broadcasting management server through a broadcasting channel. Also, the broadcasting channel can include a satellite channel and a terrestrial channel, and the broadcasting management server can be a server that generates and transmits broadcasting signals and/or broadcasting related information or a server that receives previously created broadcasting signals and/or broadcasting related information and transmits the broadcasting signals and/or broadcasting related information to a terminal.

Further, the broadcasting signals can include not only TV broadcasting signals, radio broadcasting signals and data broadcasting signals, but also signals in the form of combination of a TV broadcasting signal and a radio broadcasting signal. In addition, the broadcasting related information can be information on a broadcasting channel, a broadcasting program or a broadcasting service provider, and can be provided even through a mobile communication network. In the latter case, the broadcasting related information can be received by the mobile communication module 112.

Also, the broadcasting related information can exist in various forms. For example, the broadcasting related information can exist in the form of an electronic program guide (EPG) of the digital multimedia broadcasting (DMB) system or in the form of an electronic service guide (ESG) of the digital video broadcast-handheld (DVB-H) system.

In addition, the broadcasting receiving module 111 receives broadcasting signals using various broadcasting systems. Particularly, the broadcasting receiving module 111 can receive digital broadcasting signals using digital broadcasting systems such as the digital multimedia broadcasting-terrestrial (DMB-T) system, the digital multimedia broadcasting-satellite (DMB-S) system, the media forward link only (MediaFLO) system, the DVB-H and integrated services digital broadcast-terrestrial (ISDB-T) systems, etc. The broadcasting receiving module 111 can also be constructed to be suited to broadcasting systems providing broadcasting signals other than the above-described digital broadcasting systems.

Further, the broadcasting signals and/or broadcasting related information received through the broadcasting receiving module 111 can be stored in the memory 160. The mobile communication module 112 transmits/receives a radio signal to/from at least one of a base station, an external terminal and a server on a mobile communication network. The radio signal can include a voice call signal, a video telephony call signal or data in various forms according to transmission and reception of text/multimedia messages.

In addition, the wireless Internet module 113 corresponds to a module for wireless Internet access and can be included in the mobile terminal 100 or externally attached to the mobile terminal 100. A wireless LAN (WLAN) (Wi-Fi), wireless broadband (Wibro), world interoperability for microwave access (Wimax), high speed downlink packet access (HSDPA) and so on can be used as a wireless Internet technique.

Also, the local area communication module 114 corresponds to a module for local area communication. Further, bluetooth, radio frequency identification (RFID), infrared data association (IrDA), ultra wideband (UWB) and ZigBee can be used as a local area communication technique.

The position information module 115 confirms or obtains the position of the mobile terminal. In more detail, a global positioning system (GPS) module is a representative example of the position information module 115. In addition, the GPS module 115 can calculate information on distances between one point or object and at least three satellites and information on the time when the distance information is measured and apply trigonometry to the obtained distance information to obtain three-dimensional position information on the point or object according to the latitude, longitude and altitude at a predetermined time.

Furthermore, a method of calculating position and time information using three satellites and correcting the calculated position and time information using another satellite can also used. In addition, the GPS module 115 continuously calculates the current position in real time and calculates velocity information using the position information.

Referring to FIG. 1, the A/V input unit 120 is used to input an audio signal or a video signal and includes a camera 121 and a microphone 122. The camera 121 processes image frames of still images or moving images obtained by an image sensor in a video telephony mode or a photographing mode. Further, the processed image frames can be displayed on a display unit 151.

Also, the image frames processed by the camera 121 can be stored in the memory 160 or transmitted to an external device through the radio communication unit 110. The mobile terminal 100 can also include at least two cameras. The microphone 122 receives an external audio signal in a call mode, a recording mode or a speed recognition mode and processes the received audio signal into electric audio data.

The audio data can then be converted into a form that can be transmitted to a mobile communication base station through the mobile communication module 112 and output in the call mode. Further, the microphone 122 can employ various noise removal algorithms for removing noise generated when the external audio signal is received.

In addition, the user input unit 130 receives input data for controlling the operation of the terminal from a user. The user input unit 130 can include a keypad, a dome switch, a touch pad (constant voltage/capacitance), jog wheel, jog switch and so on.

Also, the sensing unit 140 senses the current state of the mobile terminal 100, such as an open/close state of the mobile terminal 100, the position of the mobile terminal 100, whether a user touches the mobile terminal 100, the direction of the mobile terminal 100 and the acceleration/deceleration of the mobile terminal 100, and generates a sensing signal for controlling the operation of the mobile terminal 100.

For example, the sensing unit 140 can sense whether a slide phone is opened or closed when the mobile terminal 100 is the slide phone. Furthermore, the sensing unit 140 can sense whether the power supply 190 supplies power and whether the interface 170 is connected to an external device. The sensing unit 140 can also include a proximity sensor.

In addition, the output unit 150 generates visual, auditory or tactile output and can include the display unit 151, an audio output module 152, an alarm 153 and a haptic module 154. Further, the display unit 151 displays information processed by the mobile terminal 100. For example, the display unit 151 displays a user interface (UI) or graphic user interface (GUI) related to a telephone call when the mobile terminal is in the call mode. The display unit 151 also displays a captured or/and received image, UI or GUI when the mobile terminal 100 is in the video telephony mode or the photographing mode.

In addition, the display unit 151 can include at least one of a liquid crystal display, a thin film transistor liquid crystal display, an organic light-emitting diode display, a flexible display and a three-dimensional display. Further, some of these displays can be of a transparent type or a light transmission type. That is, the display unit 151 can include a transparent display.

In more detail, the transparent display includes a transparent liquid crystal display. Further, the rear structure of the display unit 151 can also be of the light transmission type. Accordingly, a user can see an object located behind the body of the mobile terminal 100 through the transparent area of the body of the mobile terminal 100, which is occupied by the display unit 151.

The mobile terminal 100 can also include at least two display units 151. For example, the mobile terminal 100 can include a plurality of displays that are arranged on a single face at a predetermined distance or integrated displays. The plurality of displays can also be arranged on different sides.

In addition, when the display unit 151 and a sensor sensing touch (referred to as a touch sensor hereinafter) form a layered structure, which is referred to as a touch screen hereinafter, the display unit 151 can be used as an input device in addition to an output device. The touch sensor can be in the form of a touch film, a touch sheet and a touch pad, for example.

Further, the touch sensor can be constructed to convert a variation in pressure applied to a specific portion of the display unit 151 or a variation in capacitance generated at a specific portion of the display unit 151 into an electric input signal. The touch sensor can also be constructed to sense pressure of touch as well as the position and area of the touch.

Also, when the user applies touch input to the touch sensor, a signal corresponding to the touch input is transmitted to a touch controller. The touch controller then processes the signal and transmits data corresponding to the processed signal to the controller 180. Accordingly, the controller 180 can detect a touched portion of the display 151.

Referring to FIG. 1, the proximity sensor of the sensing unit 140 can be located in an internal region of the mobile terminal, surrounded by the touch screen, or near the touch screen. The proximity sensor senses an object approaching a predetermined sensing face or an object located near the proximity sensor using an electromagnetic force or infrared rays without having mechanical contact. Further, the proximity sensor has lifetime longer than that of a contact sensor and thus has a wide application in the mobile terminal 100.

In addition, the proximity sensor includes a transmission type photo-electric sensor, a direct reflection type photo-electric sensor, a mirror reflection type photo-electric sensor, a high-frequency oscillating proximity sensor, a capacitive proximity sensor, a magnetic proximity sensor, an infrared proximity sensor, etc. Further, a capacitive touch screen is constructed such that proximity of a pointer is detected through a variation in an electric field according to the proximity of the pointer. In this instance, the touch screen (touch sensor) can be classified as a proximity sensor.

For convenience of explanation, the action of the pointer approaching the touch screen without actually touching the touch screen is referred to as "proximity touch" and an action of bringing the pointer into contact with the touch screen is referred to as "contact touch" in the following description. In addition, the proximity touch point of the pointer on the touch screen corresponds to a point of the touch screen to which the pointer touches the touch screen.

Further, the proximity sensor senses the proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can then be displayed on the touch screen.

Also, the audio output module 152 can output audio data received from the radio communication unit 110 or stored in the memory 160 in a call signal receiving mode, a telephone call mode or a recording mode, a speech recognition mode and a broadcasting receiving mode. Further, the audio output module 152 outputs audio signals related to functions (for example, a call signal incoming tone, a message incoming tone, etc.) performed in the mobile terminal 100. The audio output module 152 can include a receiver, a speaker, a buzzer, etc.

In addition, the alarm 153 outputs a signal for indicating the generation of an event of the mobile terminal 100. For example, alarms can be generated when receiving a call signal, receiving a message, inputting a key signal, inputting touch, etc. The alarm 153 can also output signals in forms different from video signals or audio signals, for example, a signal for indicating generation of an event through vibration. The video signals or the audio signals can be also output through the display unit 151 or the audio output module 152.

Also, the haptic module 154 generates various haptic effects that the user can feel. One representative example of the haptic effects is vibration. The intensity and pattern of vibration generated by the haptic module 154 can also be controlled. For example, different vibrations can be combined and output or can be sequentially output.

Further, the haptic module 154 can generate a variety of haptic effects including an effect of stimulus according to arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 can also not only transmit haptic effects through direct contact but also allow the user to feel haptic effects through a kinesthetic sense of the user's fingers or arms. The mobile terminal 100 can also include multiple haptic modules 154.

In addition, the memory 160 can store a program for the operation of the controller 180 and temporarily store input/output data (for example, phone book, messages, still images, moving images, etc.). The memory 160 can also store data about vibrations and sounds in various patterns, which are output from when a touch input is applied to the touch screen.

Further, the memory 160 can include at least one of a flash memory, a hard disk type memory, a multimedia card micro type memory, a card type memory (for example, SD or XD memory), a random access memory (RAM), a static RAM (SRAM), a read-only memory (ROM), an electrically erasable programmable ROM (EEPROM), a programmable ROM (PROM) magnetic memory, a magnetic disk and an optical disk. The mobile terminal 100 can also operate in relation to a web storage performing the storing function of the memory 160 on the Internet.

The interface 170 serves as a path to external devices connected to the mobile terminal 100. Further, the interface 170 receives data from the external devices or power and transmits the data or power to the internal components of the mobile terminal 100 or transmits data of the mobile terminal 100 to the external devices. Also, the interface 170 can include a wired/wireless headset port, an external charger port, a wired/wireless data port, a memory card port, a port for connecting a device having a user identification module, an audio I/O port, a video I/O port, an earphone port, etc., for example.

In addition, the interface 170 can also interface with a user identification module that is a chip that stores information for authenticating the authority to use the mobile terminal 100. For example, the user identification module can be a user identify module (UIM), a subscriber identify module (SIM) and a universal subscriber identify module (USIM). An identification device including the user identification module can also be manufactured in the form of a smart card. Accordingly, the identification device can be connected to the mobile terminal 100 through a port of the interface 170.

The interface 170 can also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle can be used as signals for confirming whether the mobile terminal is correctly set in the cradle.

In addition, the controller 180 controls the overall operations of the mobile terminal. For example, the controller 180 performs control and processing for voice communication, data communication and video telephony. As shown in FIG. 1, the controller 180 also includes a multimedia module 181 for playing multimedia. Also, the multimedia module 181 can be included in the controller 180 as shown in FIG. 1 or can be separated from the controller 180.

Further, the controller 180 can perform a pattern recognition process capable of recognizing handwriting input or picture-drawing input applied to the touch screen as characters or images. In addition, the power supply 190 receives external power and internal power and provides power required for the operations of the components of the mobile terminal under the control of the controller 180.

Figure 2A:
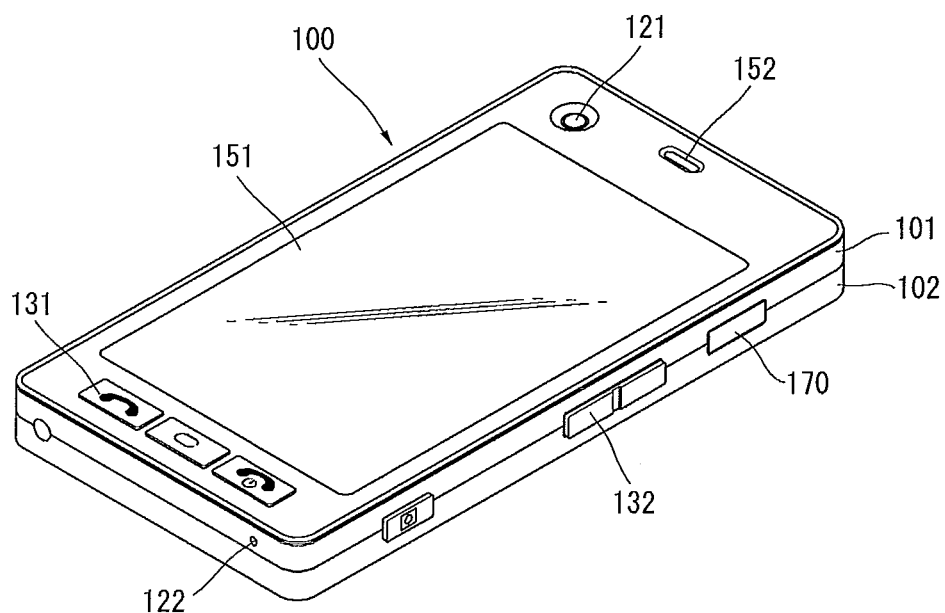
FIG. 2A is a front perspective view of a handheld terminal according to an embodiment of the present invention.

Next, FIG. 2A is a front perspective view of a mobile terminal or a handheld terminal 100 according to an embodiment of the present invention. In this example, the handheld terminal 100 is a bar type terminal body. However, the present invention is not limited to a bar type terminal and can be applied to terminals of various types including slide type, folder type, swing type and swivel type terminals.

In addition, the terminal body includes a case (a casing, a housing, a cover, etc.) forming the exterior of the terminal 100. In the present embodiment, the case is divided into a front case 101 and a rear case 102. Further, various electronic components are arranged in the space formed between the front case 101 and the rear case 102. At least one middle case can also be additionally arranged between the front case 101 and the rear case 102. Also, the cases can be formed of plastics through injection molding or made of a metal material such as stainless steel (STS) or titanium (Ti).

As shown in FIG. 2A, the display unit 151, the audio output unit 152, the camera 121, user input units 131 and 132, the microphone 122 and the interface 170 are arranged in the terminal body, specifically, in the front case 101. In addition, the display unit 151 occupies most of the main face of the front case 101.

Further, the audio output unit 152 and the camera 121 are arranged in a region in proximity to one of both ends of the display unit 151. Also, the user input unit 131 and the microphone 122 are located in a region in proximity to the other end of the display unit 151. Also include is another user input unit 132, which is arranged with the interface 170 on the sides of the front case 101 and the rear case 102.

Thus, in this embodiment, the user input unit 130 includes multiple operating units 131 and 132 that are operated to receive commands for controlling the operation of the handheld terminal 100. Further, the operating units 131 and 132 can be referred to as manipulating portions and employ any tactile manner in which a user operates the operating units 131 and 132 while producing a tactile feeling.

Also, the operating units 131 and 132 can receive various inputs. For example, the operating unit 131 receives commands such as start and end a call, and the operating unit 132 receives commands such as to control the volume of the sound output from the audio output unit 152 or to convert the display unit 151 into a touch recognition mode.

Figure 2B:
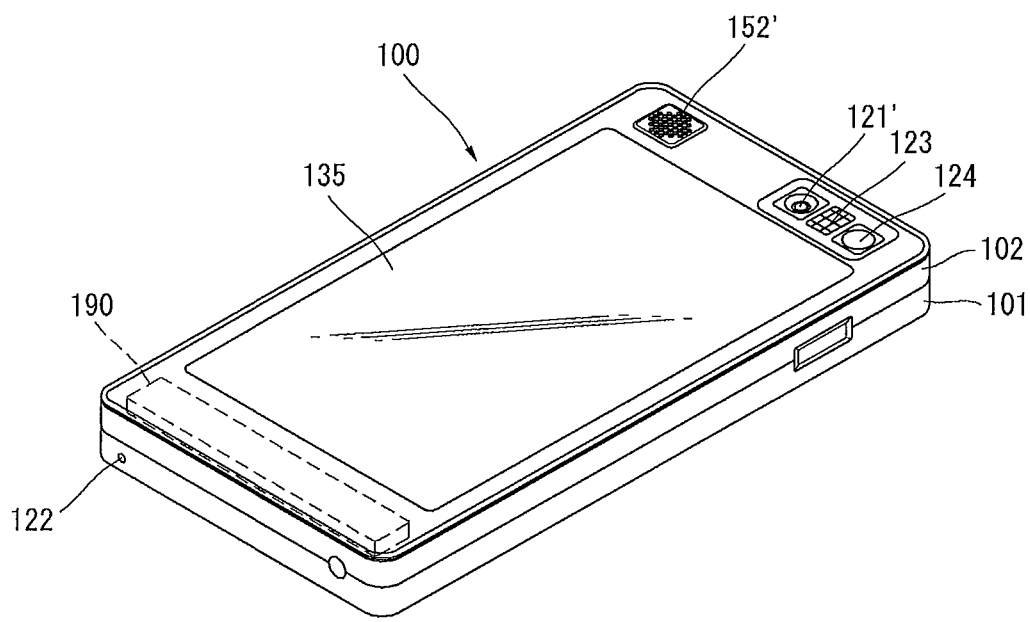
FIG. 2B is a rear perspective view of the handheld terminal shown in FIG. 2A according to an embodiment of the present invention.

Next, FIG. 2B is a rear perspective view of the handheld terminal shown in FIG. 2A according to an embodiment of the present invention. As shown in FIG. 2B, a camera 121' is additionally attached to the rear side of the terminal body, that is, the rear case 102. In this configuration, the camera 121' has a photographing direction that is opposite to that of the camera 121 shown in FIG. 2a and can have pixels different from those of the camera 121 shown in FIG. 2A.

For example, in one example, it is preferable that the camera 121 has low pixels such that it can capture an image of the face of a user and transmit the image to a receiving part during video telephony while the camera 121' has high pixels such that it can capture an image of a general object and does not immediately transmit the image in many situations. The cameras 121 and 121' can also be attached to the terminal body such that they can be rotated or popped-up.

As shown in FIG. 2B, a flash bulb 123 and a mirror 124 are additionally arranged in proximity to the camera 121'. The flash bulb 123 lights an object when the camera 121' takes a picture of the object, and the mirror 124 is used for the user to look at his or her face when the user wants to take a picture of themselves using the camera 121'.

An audio output unit 152' is also additionally provided on the rear side of the terminal body. In this embodiment, the audio output unit 152' can achieve a stereo function with the audio output unit 152 shown in FIG. 2A and be used in a speaker phone mode when the terminal is used for a telephone call.

A broadcasting signal receiving antenna can also be additionally attached to a side of the terminal body in addition to an antenna for telephone calls. The antenna forming a part of the broadcasting receiving module 111 shown in FIG. 1 can be set in the terminal body such that the antenna can be pulled out of the terminal body.

In addition, the power supply 190 for providing power to the handheld terminal 100 is set in the terminal body, and can be included in the terminal body or detachably attached to the terminal body. FIG. 2B also illustrates a touch pad 135 for sensing touch additionally attached to the rear case 102 of the terminal 100. Further, the touch pad 135 can be a light transmission type as the display module 151. In this instance, when the display module 151 outputs visual information through both sides, the visual information can be recognized through the touch pad 135.

Also, the information output through both sides of the display module 151 can be controlled by the touch pad 135. In addition, a display can be additionally attached to the touch pad 135 such that a touch screen can be arranged even in the rear case 102. Further, the touch pad 135 operates in connection with the display module 151 of the front case 101, and can be located in parallel with the display module 151 behind the display module 151. The touch panel 135 can also be identical to or smaller than the display unit 151 in size.

The interoperations of the display unit 151 and the touch pad 135 will now be described with reference to FIGS. 3A and 3B. In more detail, FIGS. 3A and 3B are front views of the handheld terminal 100 and are used for explaining an operating state of the handheld terminal according to an embodiment of the present invention.

The display module 151 can display various types of visual information in the form of characters, numerals, symbols, graphic or icons. To input the information, at least one of the characters, numerals, symbols, graphic and icons are displayed in predetermined arrangement in the form of a keypad. Also, the keypad can be referred to as a 'soft key'.

Figure 3A:
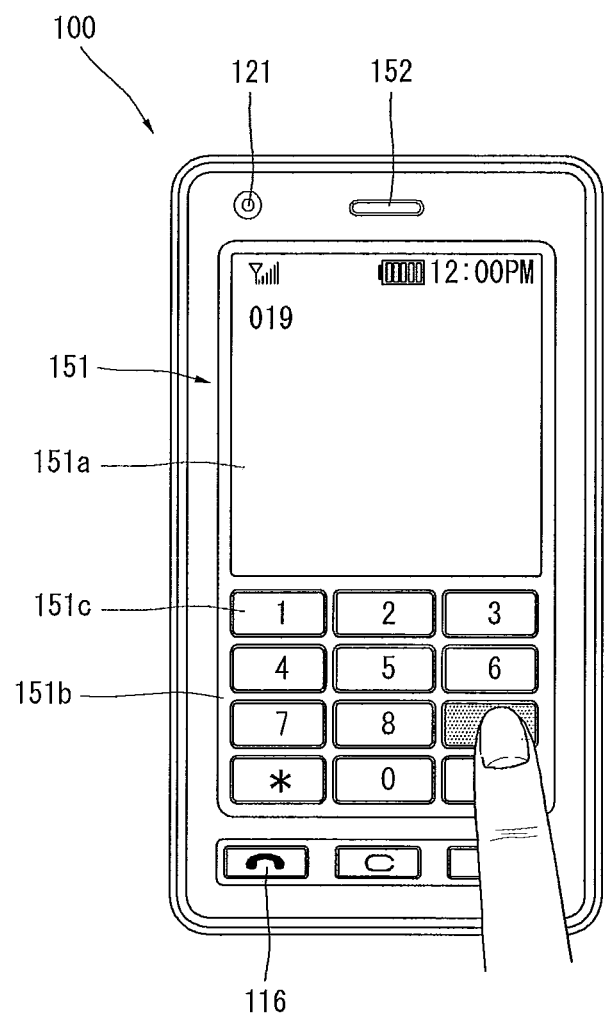
FIGS. 3A and 3B are front views of a handheld terminal for explaining an operation of the handheld terminal according to an embodiment of the present invention.
Figure 3B:
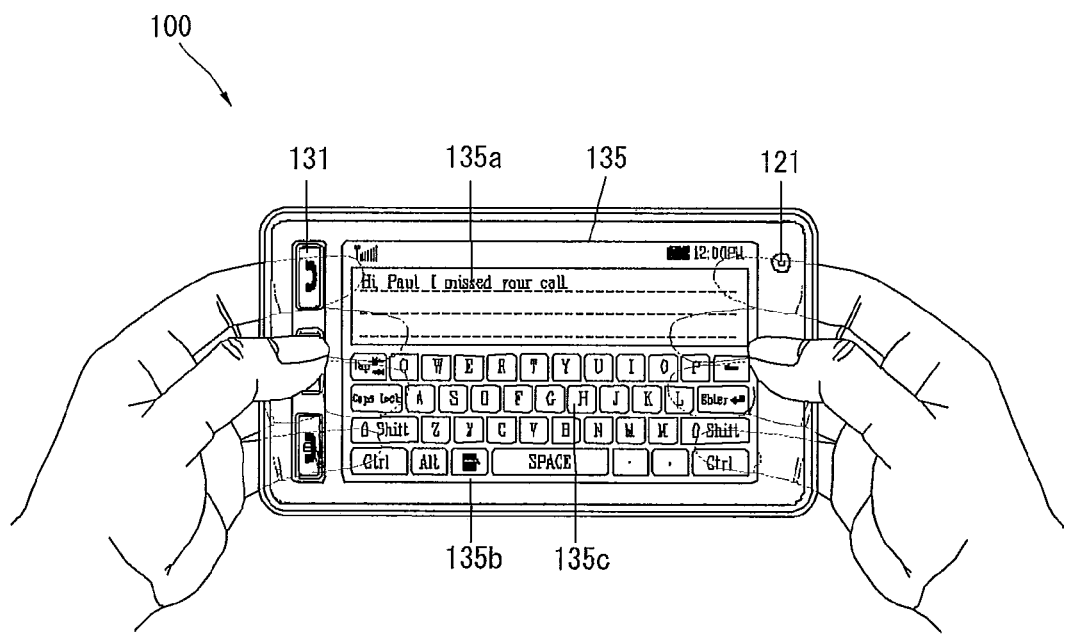

Further, FIG. 3A shows that touch applied to a soft key is input through the front side of the terminal body. The display module 151 can be a single area or can be divided into a plurality of regions. In the latter instance, the display unit 151 is constructed such that the plurality of regions interoperate with each other.

For example, and as shown in FIG. 3A, an output region 151a and an input region 151b are respectively displayed in upper and lower parts of the display module 151. The input region 151b displays soft keys 151c that represent numerals used to input numbers such as telephone numbers. Thus, when a soft key 151c is touched, a numeral corresponding to the touched soft key is displayed on the output region 151a. Further, when the user operates the first operating unit 116, a connection of a call corresponding to a telephone number displayed on the output region 151a is attempted.

Next, FIG. 3B is an overview of the mobile terminal 100 showing that touch applied to soft keys is input through the rear side of the terminal body. FIG. 3B also shows the landscape of the terminal body while FIG. 3A shows the portrait of the terminal body. In addition, the display unit 151 is constructed such that an output image is converted according to the direction in which the terminal body is located.

Further, FIG. 3B shows the operation of the handheld terminal in a text input mode. As shown, the display unit 151 includes a touch pad display 135 having an output region 135a and an input region 135b. A plurality of soft keys 135c indicating at least one of characters, symbols and numerals are also arranged in the input region 135b. Further, in this embodiment, the soft keys 135c are arranged in the form of QWERTY keys.

Thus, when the soft keys 135c are touched through the touch pad 135, the characters, numerals and symbols corresponding to the touched soft keys 135c are displayed on the output region 135a. Touch input through the touch pad 135 can prevent the soft keys 135c from being covered with user's fingers when the soft keys 135c are touched as compared to touch input through the display unit 151. Further, when the display unit 151 and the touch pad 135 are transparent, the user can see his or her fingers located behind the terminal body, and thus can select items by touching the backside or surface of the displayed keys 135c.

In addition, the user can scroll the display unit 151 or the touch pad 135 to move an object displayed on the display unit 151, for example, by using a cursor or a pointer located on an icon. Also, when the user moves his or her finger on the display unit 151 or the touch pad 135, the controller 180 can visually display the user's finger moving path on the display unit 151. This is useful to edit an image displayed on the display unit 151.

Also, when the display unit 151 (touch screen) and the touch pad 135 are simultaneously touched within a predetermined period of time, a specific function of the terminal can be executed. For example, the user can clamp the terminal body using their thumb and index finger. This specific function can include activating or deactivating the display unit 151 or the touch pad 135, for example.

The proximity sensor described with reference to FIG. 1 will now be explained in more detail with reference to FIG. 4. That is, FIG. 4 is a conceptual diagram used for explaining a proximity depth of the proximity sensor.

Figure 4:
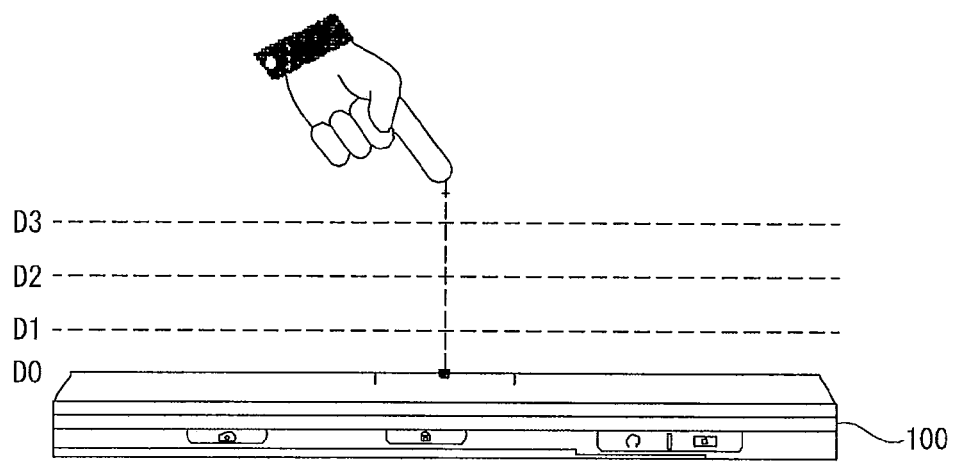
FIG. 4 is a conceptual view for explaining a proximity depth of a proximity sensor.

As shown in FIG. 4, when a pointer such as a user's finger approaches the touch screen, the proximity sensor located inside or near the touch screen senses the approach and outputs a proximity signal. Further, the proximity sensor can be constructed such that it outputs a proximity signal according to the distance between the pointer approaching the touch screen and the touch screen (referred to as "proximity depth").

Also, the distance in which the proximity signal is output when the pointer approaches the touch screen is referred to as a detection distance. The proximity depth can be determined using a plurality of proximity sensors having different detection distances and comparing proximity signals respectively output from the proximity sensors.

FIG. 4 shows the section of the touch screen in which proximity sensors capable of sensing three proximity depths are arranged. Of course, proximity sensors capable of sensing less than three or more than three proximity depths can be arranged in the touch screen.

Thus, as shown in FIG. 4, when the pointer (user's finger in this example) completely comes into contact with the touch screen (D0), the controller 180 recognizes this action as the contact touch. When the pointer is located within a distance D1 from the touch screen, the controller 180 recognizes this action as a proximity touch of a first proximity depth.

Similarly, when the pointer is located in a range between the distance D1 and a distance D2 from the touch screen, the controller 180 recognizes this action as a proximity touch of a second proximity depth. When the pointer is located in a range between the distance D2 and a distance D3 from the touch screen, the controller 180 recognizes this action a proximity touch of a third proximity depth. Also, when the pointer is located at longer than the distance D3 from the touch screen, the controller 180 recognizes this action as a cancellation of proximity touch.

Accordingly, the controller 180 can recognize the proximity touch as various input signals according to the proximity distance and proximity position of the pointer with respect to the touch screen and perform various operations according to the input signals.

Embodiments of the prevent invention will now be explained. The following description assumes the display unit 151 is a touch screen for convenience of explanation. Furthermore, the term "touch" includes both of the proximity touch and direct touch.

Figure 5:
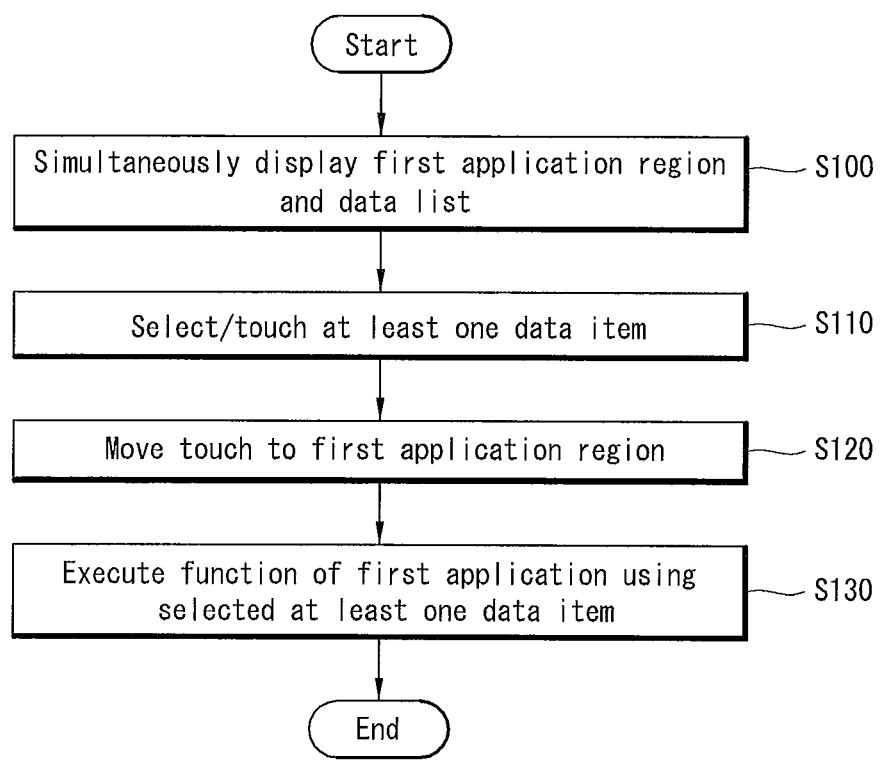
FIG. 5 is a flow chart illustrating a method of processing data in a mobile terminal with a touch screen according to a first embodiment of the present invention.
Figure 6:
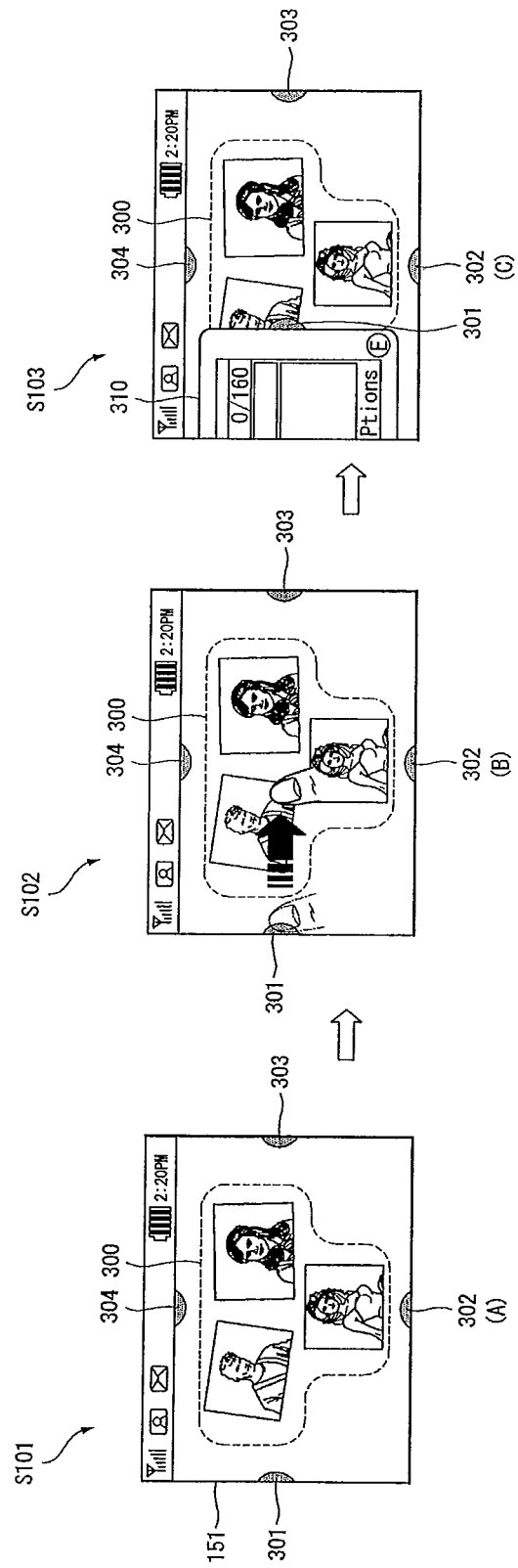
FIG. 6A-6C are overviews of display screens illustrating an example of displaying an application region with a data list according to the first embodiment of the present invention.

FIG. 5 is a flow chart illustrating a method of processing data in a mobile terminal with a touch screen according to a first embodiment of the present invention, and FIGS. 6A-6C are overviews of display screens illustrating an example of displaying an application region with a data list according to the first embodiment of the present invention. FIG. 1 will also be referred to throughout the description of the present invention.

As shown in FIG. 5, the controller 180 displays a first application with a data list in predetermined regions on the touch screen 151 (step S100). Further, the data list can correspond to at least one of text, still images, moving images, a phonebook and web connecting routes, etc. For example, the data list can correspond to text having the same attribute. The data list can also relate to still images and moving images having at least two attributes. In addition, the web connecting route can be the Internet address of a specific web site such as a uniform resource locator (URL).

A plurality of different data lists can also be displayed. For example, a data list with respect to still images and a data list with respect to moving images can be simultaneously displayed on the touch screen 151. The different data lists can also be respectively displayed in predetermined positions.

Further, the step S100 can be performed in various manners. For example, referring to FIG. 6A, the touch screen 151 displays a phonebook data list 300 in the display screen S101. In addition, the reference numerals 301, 302, 303 and 304 respectively denote icons representing different applications. Further, the phonebook data list 300 includes images of people included in the list corresponding to phone numbers of the people (or places).

Further, when a user touches the icon 301 representing a messaging application for transmitting and receiving SMS or MMS messages and drags the icon 301 towards the center of the screen as shown in the display screen S102 in FIG. 6B, the controller 180 scrolls and displays a messaging application 310 on the touch screen 151 as shown in the display screen S103 in FIG. 6C. Thus, as shown in FIGS. 6A-6C, the user can touch-and drag the icon 301 to move the messaging application 310 to a desired position.

In addition, examples of the first application include a video telephony application, a messaging application for transmitting and receiving messages, an application for web browsing (for example, a web browser), etc. Further, the region in which the first application is displayed can include a plurality of function regions for respectively providing different functions. For example, the region in which the messaging application is displayed can include at least one of a source input field for performing a function of designating a source from which a message is transmitted, a destination input field for performing a function of designating a destination to which the message is transmitted, a message input field for performing a function of inputting contents of the message, and an attachment field for performing a function of attaching a file.

Referring again to FIG. 5, the user selects at least one data item from the data list (step S110). In more detail, the user can touch the at least one data item in the data list displayed on the touch screen 151 to select the at least one data item. Further, the data list or specific data included in the data list can be moved and displayed on the touch screen 151.

Also, the data list can be managed by a second application different from the first application. For example, the data list can be managed by a specific second application according to the attribute of the data list. That is, the data list can be managed by a phonebook application, an image application, and a text application, etc.

In addition, as shown in FIG. 5, the user touches the selected at least one data item and moves the touched item to the region in which the first application is displayed (step S120). The step S120 corresponds to an operation of dragging-and-dropping the selected at least one data item to the first application region. When the first application region includes a plurality of function regions, the touched item can be moved to one of the plurality of function regions.

Then, the controller 180 executes the function of the first application using the selected at least one data item when the touch is moved (step S130). Further, when the first application region includes the plurality of function regions and the touched item is moved to one of the plurality of function regions, the controller 180 can execute a function provided by the function region to which the touch is moved.

In addition, the present invention can be applied to various embodiments according to the type of the first application. The various embodiments of the present invention will now be explained according to the type of the first application.

Figure 7:
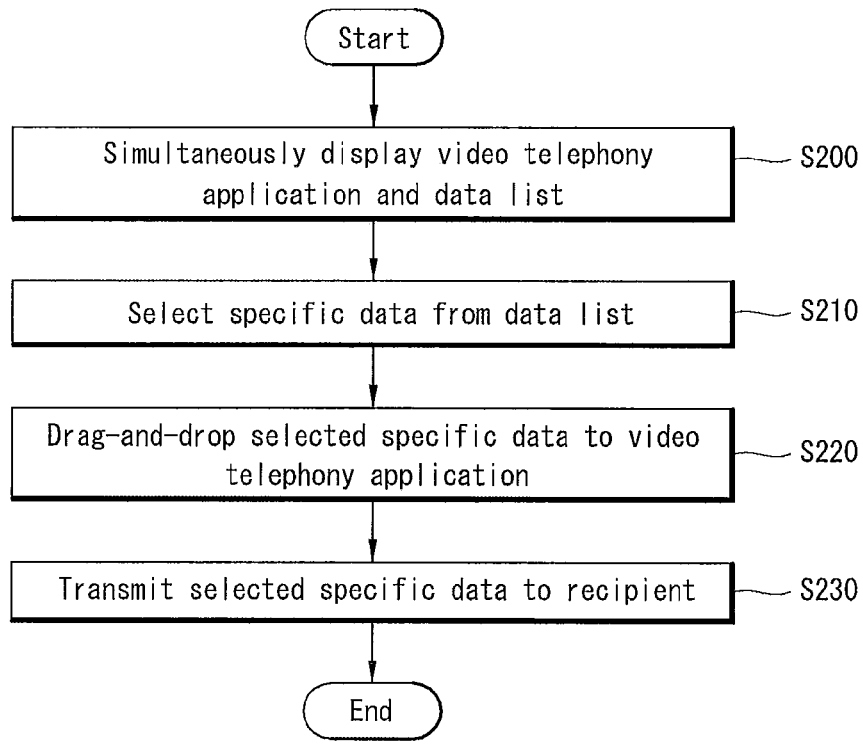
FIG. 7 is a flow chart illustrating a method of processing data in a mobile terminal with a touch screen according to a second embodiment of the present invention.

FIG. 7 is a flow chart illustrating a method of processing data in a mobile terminal with a touch screen according to a second embodiment of the present invention. In the second embodiment of the present invention, the first application corresponds to a video telephony application. FIGS. 8A-8D are overviews of display screens illustrating an example to which an embodiment of the present invention is applied in a video telephony application, and FIGS. 9A-9D are overviews of display screens illustrating another example to which the present invention is applied in the video telephony application.

As shown in FIG. 7, the controller 180 simultaneously displays a video telephony application and a data list (step S200). A user then selects specific data from the data list (step S210) and drags-and-drops the selected data to the region in which the video telephony application is displayed (step S220). Then, the controller 180 transmits the selected data to a video telephony recipient (step S230).

As shown in FIGS. 8A-8D, the controller 180 simultaneously displays a video telephony application 200 and an image list region 210 in a window 220 on the touch screen 151 (step S200 in FIG. 7). Further, the image list region 210 includes an image list 211 including a plurality of images 211*a*, 211*b*, 211*c* and 211*d*. The image list region 210 can also include a scroll bar 212 when all the images included in the image list 211 cannot be simultaneously displayed in one region. Thus, the user can operate the scroll bar 212 to access a desired image.

Further, the region in which the video telephony application 200 is displayed can include a recipient image field 202 displaying an image of a recipient who receives the video telephony call, a user image field 203 displaying an image of the user of the mobile terminal 100 and an icon field 201 displaying icons representing various functions. For example, the image displayed in the recipient image field 202 can be received from the recipient through the mobile communication module 112 or the wireless Internet module 113, and the image displayed in the user image field 203 can be obtained through the camera 121.

Figure 8A:
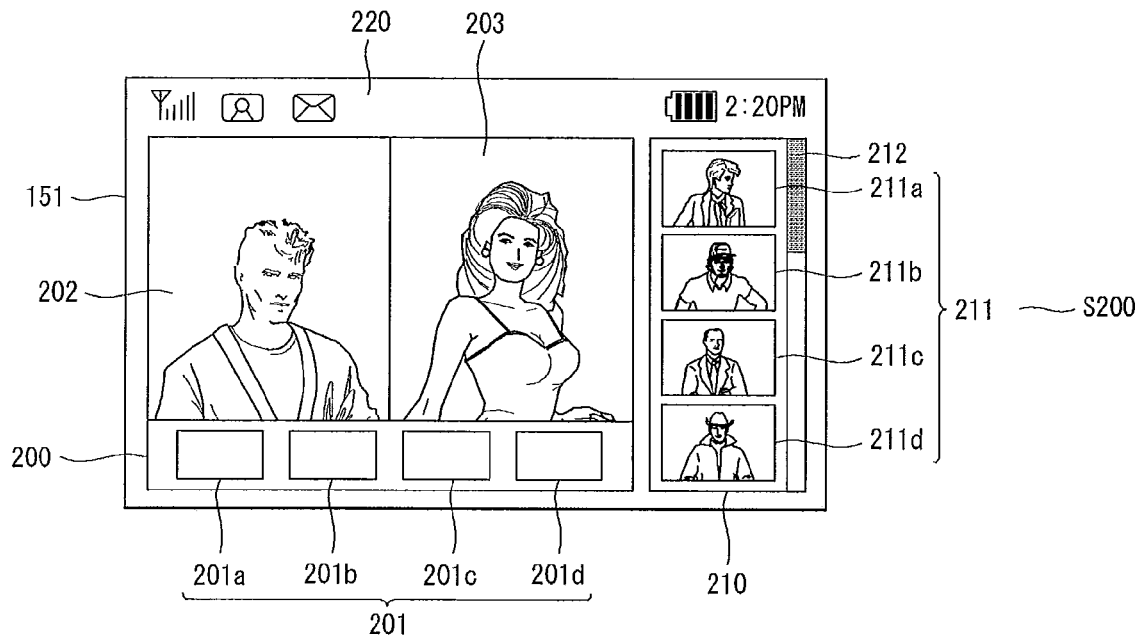
FIGS. 8A-8D are overviews of display screens illustrating an example to which the present invention is applied in a video telephony application.
Figure 8B:
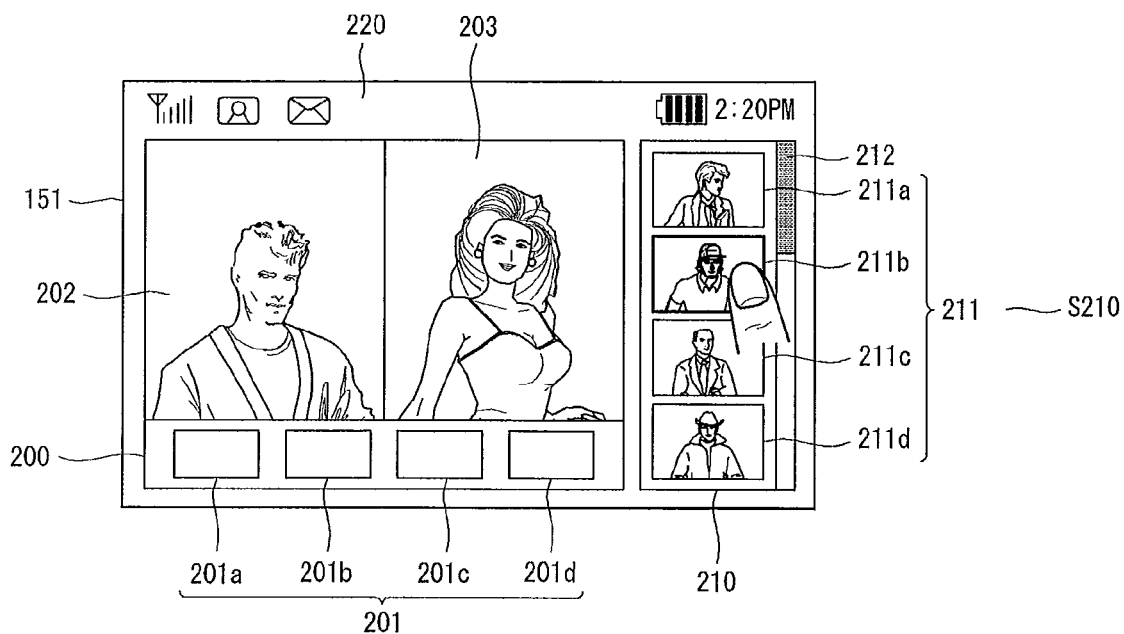
Figure 8C:
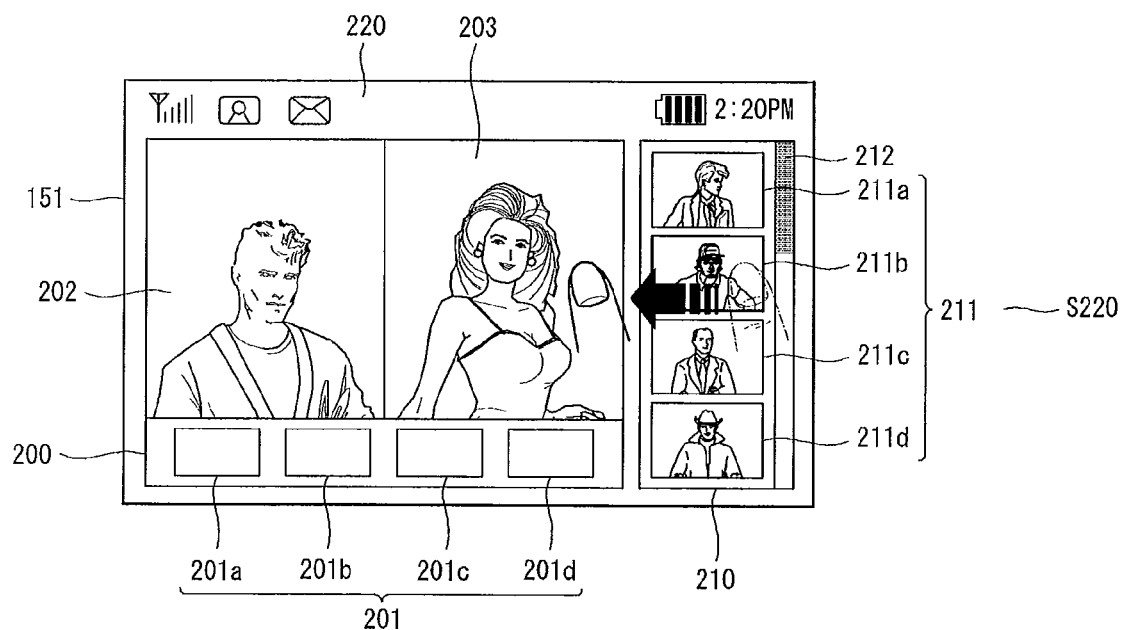

As shown in FIG. 8B, the user touches the image 211*b* that the user wants to transmit to the video telephony recipient shown in the recipient image field 202 (step S210 in FIG. 7), and as shown in FIG. 8C, drags-and drops the image 211*b* to the user image field 203 (step S220 in FIG. 7).

Figure 8D:
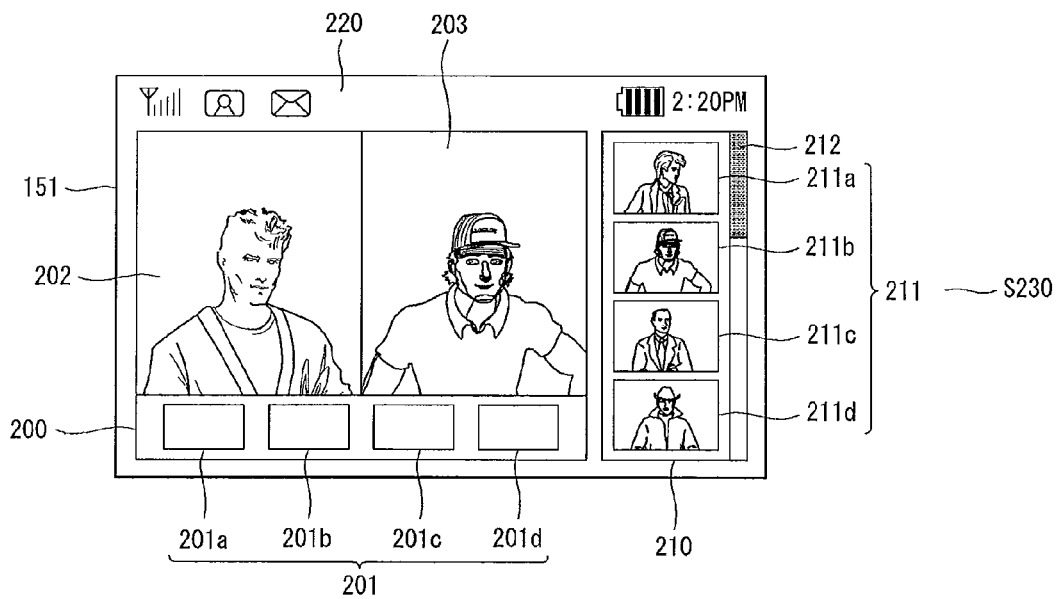

Then, the controller 180 transmits the selected image 211 to the recipient (step S230 in FIG. 7). Further, as shown in FIG. 8D, the controller 180 can replace the image of the user displayed in the user image field 203 with the selected image 211*b*. Alternatively, the controller 180 can display a message informing the user that the selected image 211*b* has been transmitted on the touch screen 151 while continuously displaying the image of the user in the user image field 203.

Referring to FIGS. 9A-9D, the controller 180 simultaneously displays the video telephony application 200 and a phonebook 230 in predetermined regions on the touch screen 151 (step S200 in FIG. 7). As shown, the phonebook 230 includes a phonebook list 231 including a plurality of phonebook data items. The scroll bar 212 can also be displayed allowing the user to scroll through the phonebook list 231 as appropriate.

Figure 9A:
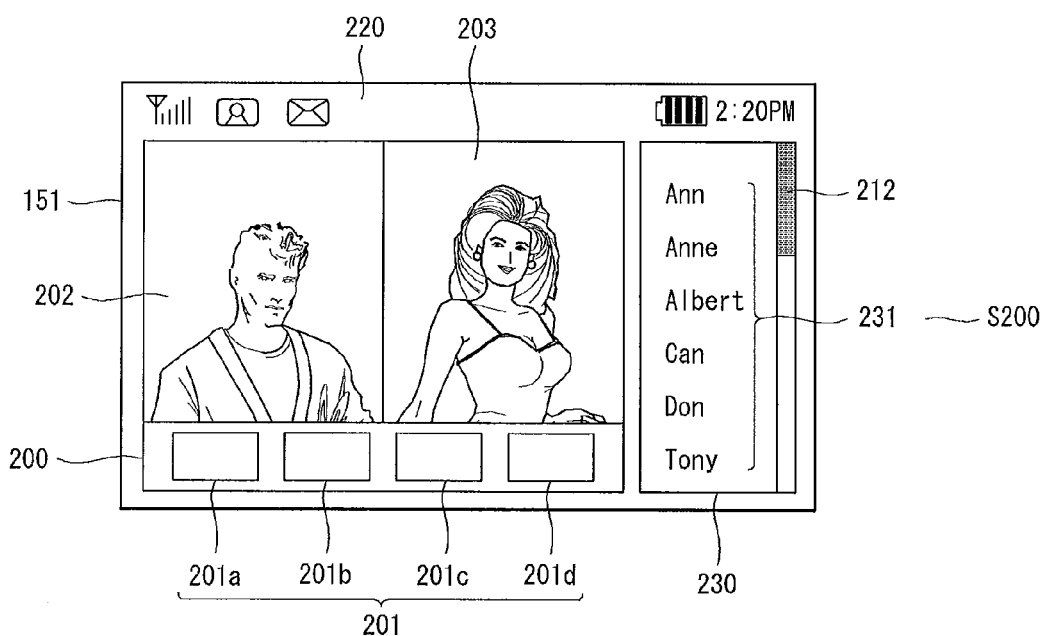
FIGS. 9A-9D are overviews of display screens illustrating another example to which the present invention is applied in the video telephony application.
Figure 9B:
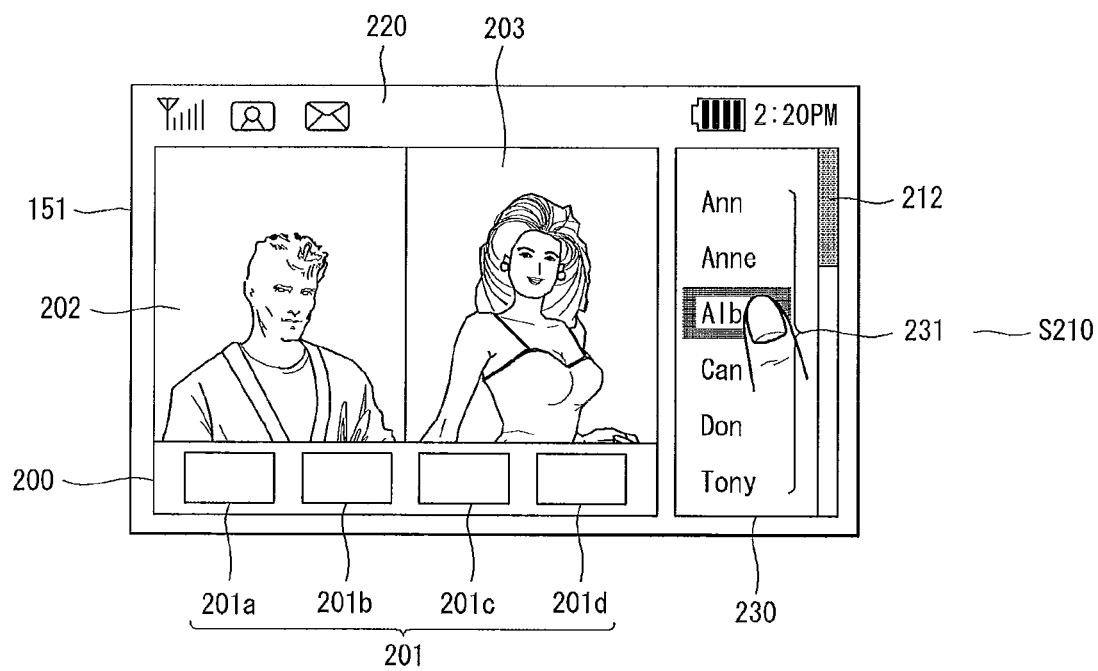
Figure 9C:
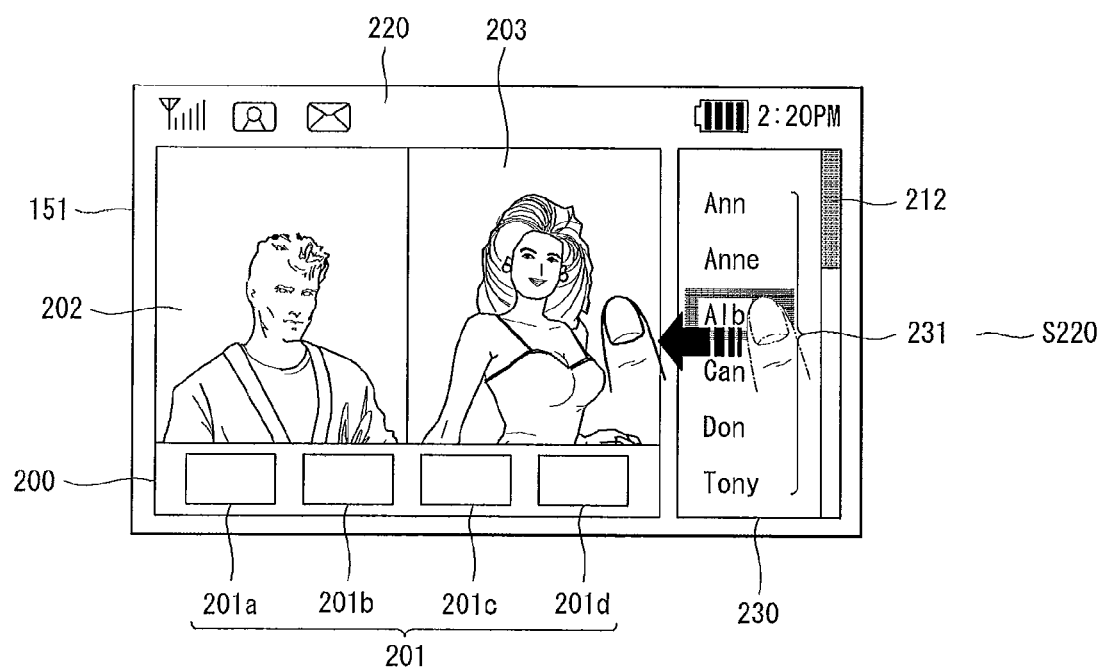

The user can then touch phonebook data that the user wants to transmit to a video telephony recipient and drag-and-drop the selected phonebook data to the user image field 203 (steps 210 and 220 in FIG. 7). In FIGS. 9B and 9C, the user selects the phonebook data corresponding to "Albert" and drags-and-drops the phonebook data to the user image field 203.

Figure 9D:
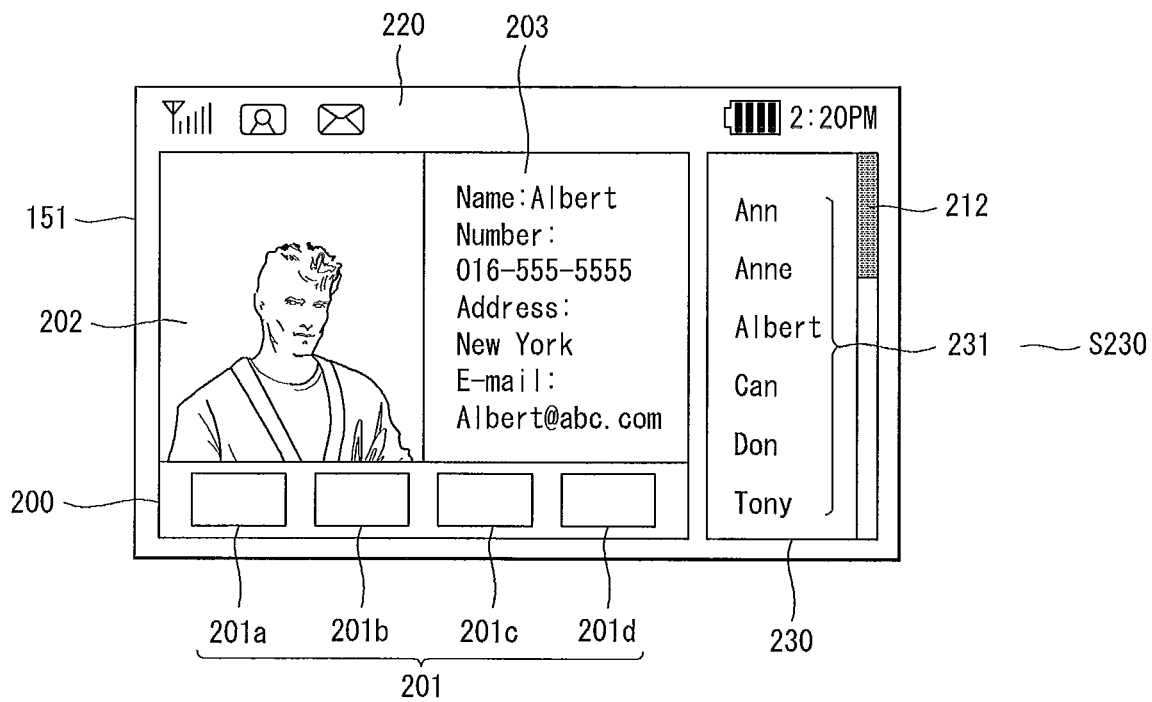

Then, the controller 180 transmits the selected phonebook data to the recipient (step S230 in FIG. 7). As shown in FIG. 9D, the controller 180 can replace the user image displayed in the user image field 203 with the selected phonebook data. Alternatively, the controller 180 can display a message informing the user that the selected phonebook data has been transmitted to the recipient on the touch screen 151 while continuously displaying the image of the user in the user image field 203.

In addition, in FIGS. 8 and 9, the user drags-and-drops the selected item onto the user image field 203. However, the user can also drag-and-drop the selected item onto the recipient image field 202. That is, the user can drag-and-drop a selected item to any location within the video call application area 200 to transmit the fie to the other party (e.g., the video recipient in the video receipt image field 202). In an alternative embodiment, the user can drag-and-drop a selected image file to any person shown in the video call application 200 to transmit the selected file to that particular person. This is particularly beneficial in video applications including multiple parties (e.g., two or more persons) such that the user can drag-and-drop a selected file or item to that particular person the user wants to transmit the file to.

Figure 10:
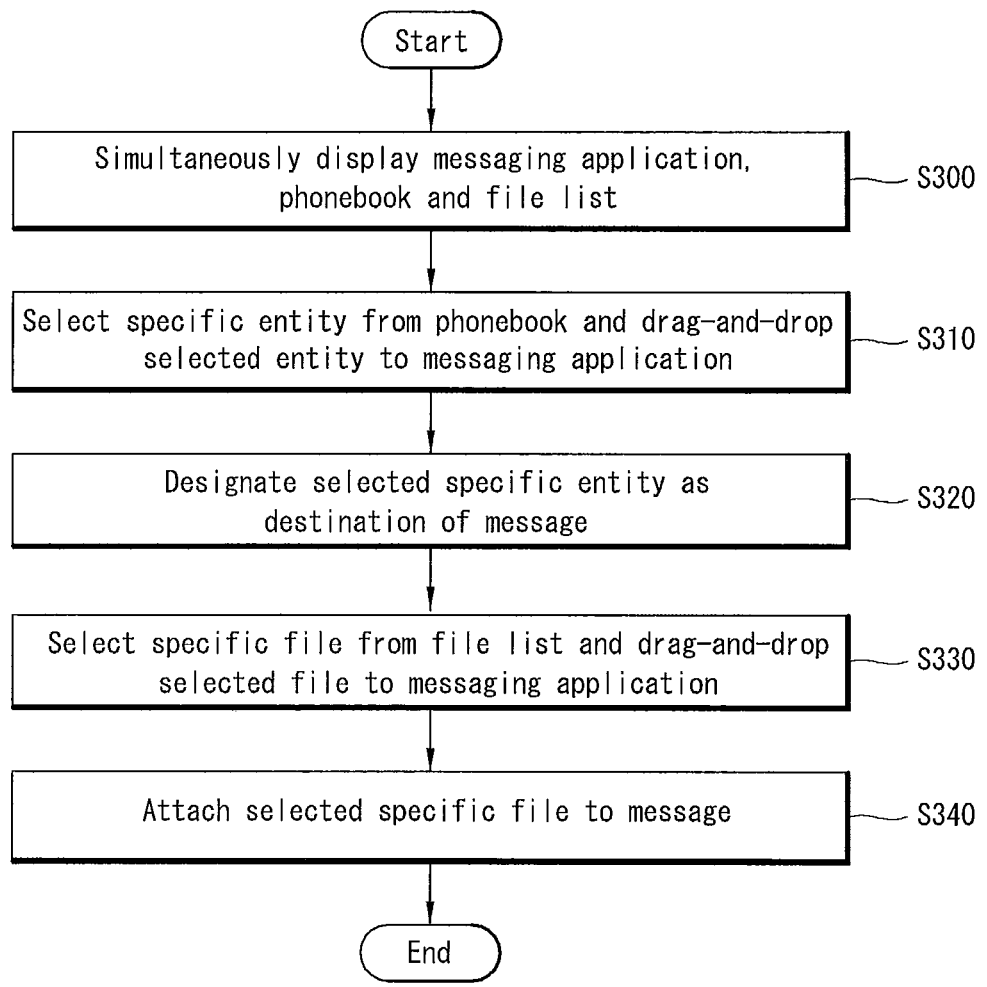
FIG. 10 is a flow chart illustrating a method of processing data in a mobile terminal with a touch screen according to a third embodiment of the present invention.

Next, FIG. 10 is a flow chart illustrating a method of processing data in a mobile terminal with a touch screen according to a third embodiment of the present invention. In the third embodiment of the present invention, the first application corresponds to a messaging application. In addition, FIGS. 11A-11E are overviews of display screens illustrating an example to which the present invention is applied in the messaging application.

As shown in FIGS. 10 and 11, the controller 180 simultaneously displays a messaging application 240, a phonebook 230 and a file list 250 in predetermined regions of a display window 220 on the touch screen 151 (step S300). Further, as shown in FIGS. 11A-11E, the region in which the messaging application 240 is displayed includes a destination field 241, an attachment file field 242 and a message compose field 243 for composing a message. Furthermore, the phonebook 230 including a phonebook list 231. In addition, the file list 250 can include various files, and in FIG. 11A, the file list 250 corresponds to a picture list.

Further, a user then selects a specific entity from the phonebook 230 and drags-and-drops the selected specific entity to the messaging application region 240. For example, in FIG. 11B, the user touches "Albert" and drags-and-drops "Albert" to the messaging application region 240. In addition, the user can drag-and-drop the specific entity to a predetermined point in the messaging application region 240 or a point included in a region to which the specific entity should be input or used. For example, the user can drag-and-drop the selected item 231 directly to the receipt field 241.

For example, the controller 180 checks the attribute of the specific entity dragged-and dropped to the messaging application region 240 and recognizes that the specific entity is data that can be used in the recipient field 241. Furthermore, the controller 180 can consider only a specific entity dragged-and dropped to the messaging application region 240 as data that can be used in the recipient field 241. The controller 180 can also analyze the attribute of the specific entity dragged-and dropped to the recipient field 241 and output a message informing the user that the specific entity cannot be used in the recipient field 241 when it is determined that that the specific entity is not the data that can be used in the recipient field 241.

Figure 11A:
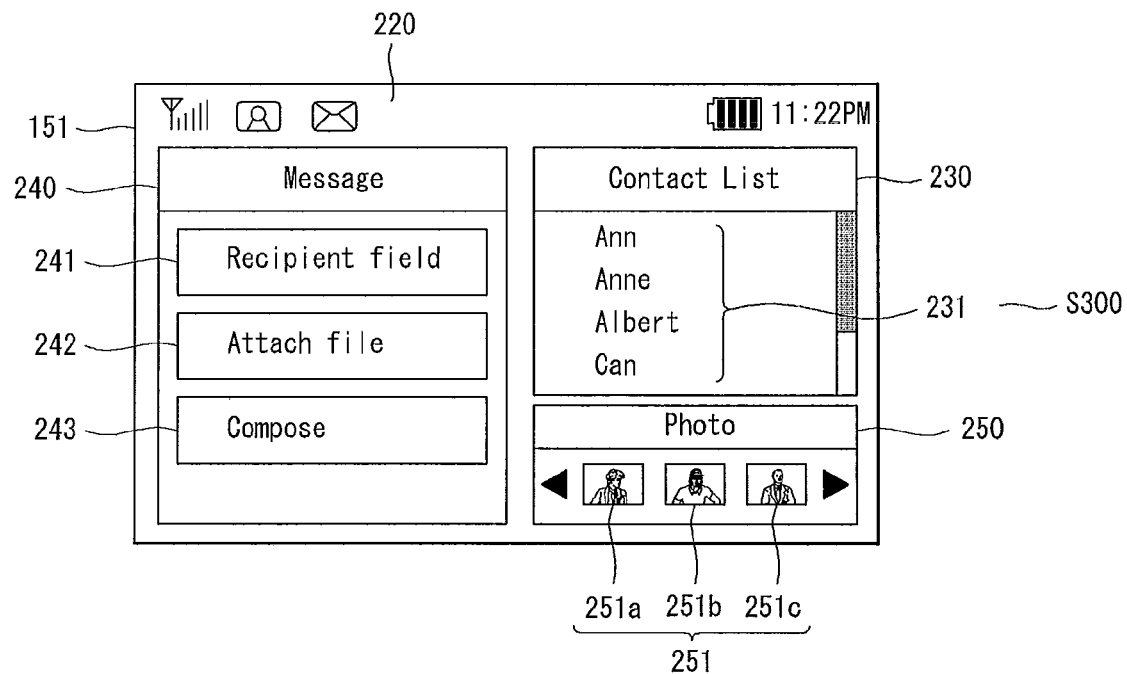
FIGS. 11A-11E are overviews of display screens illustrating an example to which the present invention is applied in a messaging application.
Figure 11B:
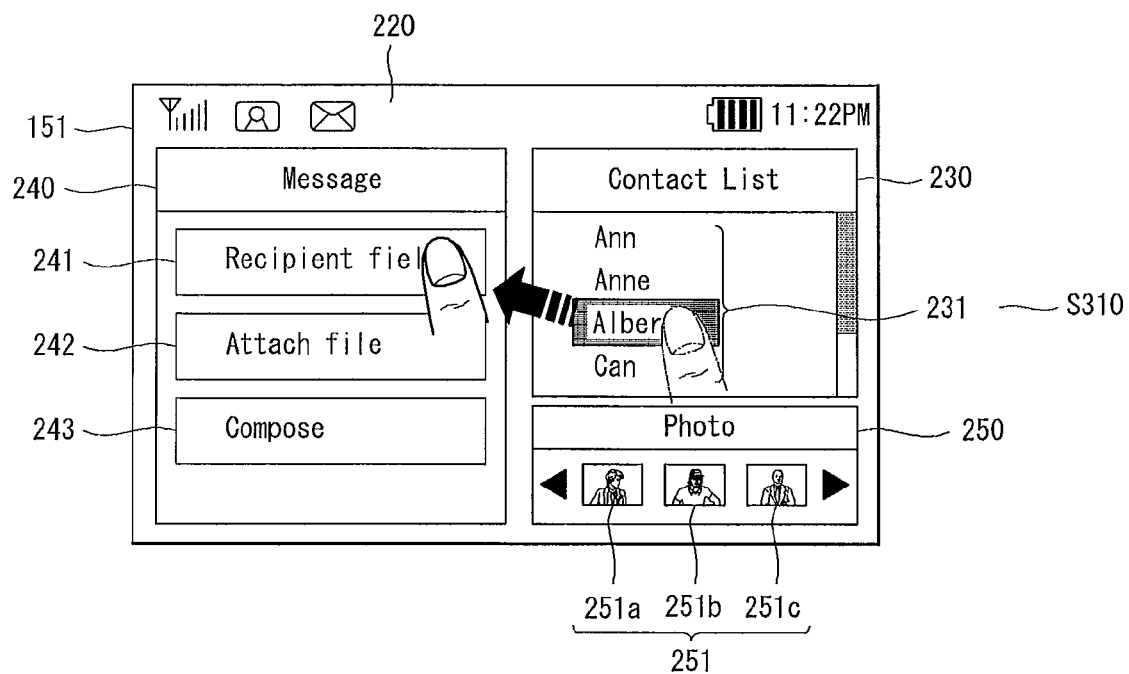
Figure 11C:
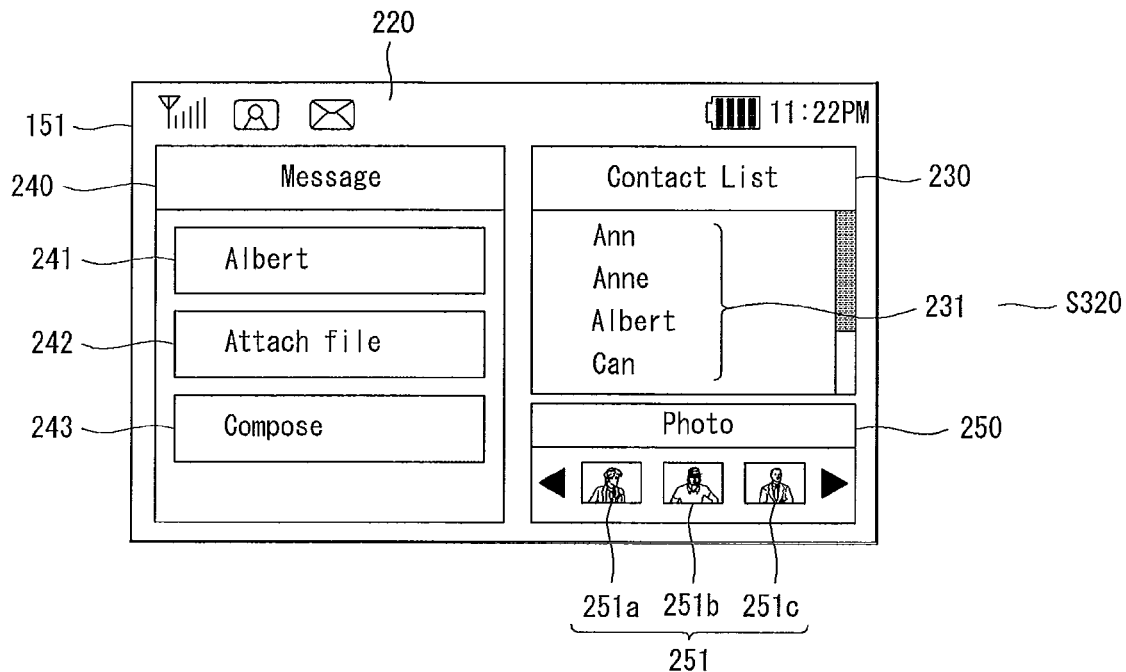

In addition, the controller 180 designates the selected specific entity as a message recipient (step S320). For example, as shown in FIG. 11C, "Albert" is displayed in the recipient field 241.

Figure 11D:
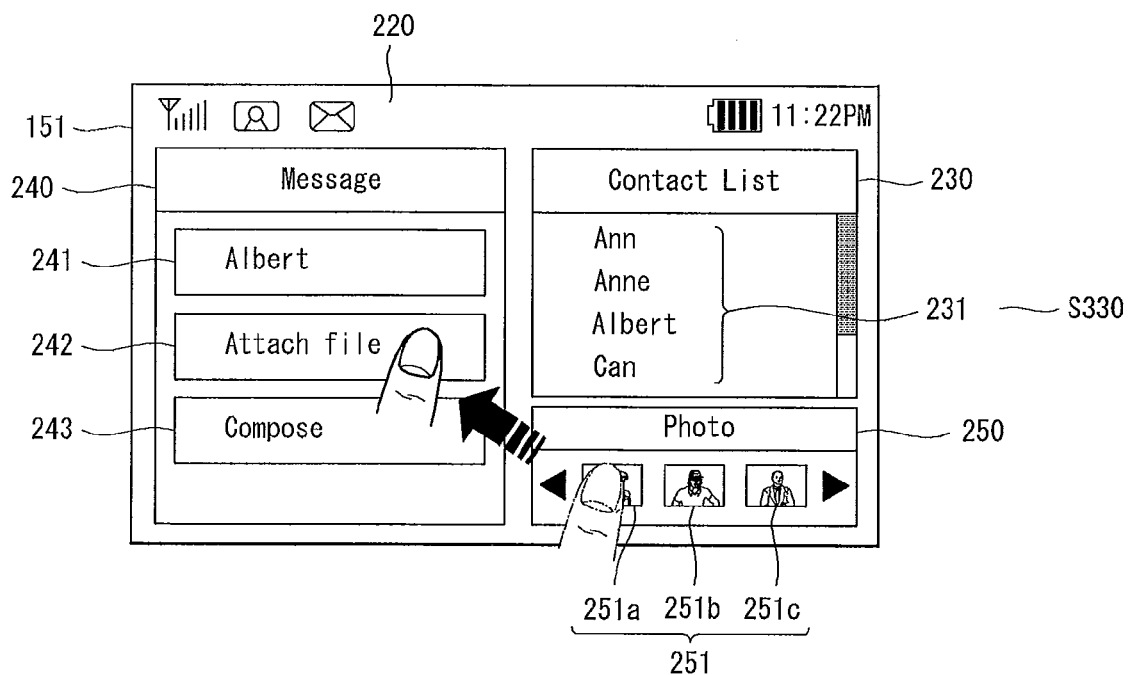

The user then selects a specific file from the file list 250 and drags-and-drops the selected file to the messaging application region 240 (step S330). For example, as shown in FIG. 11D, the user can touch a file 251a to be attached to a message and drag-and-drop the file 251a to the attachment file field 242. The user can also drag-and-drop the selected file to various points as described above with respect to step S210.

Figure 11E:
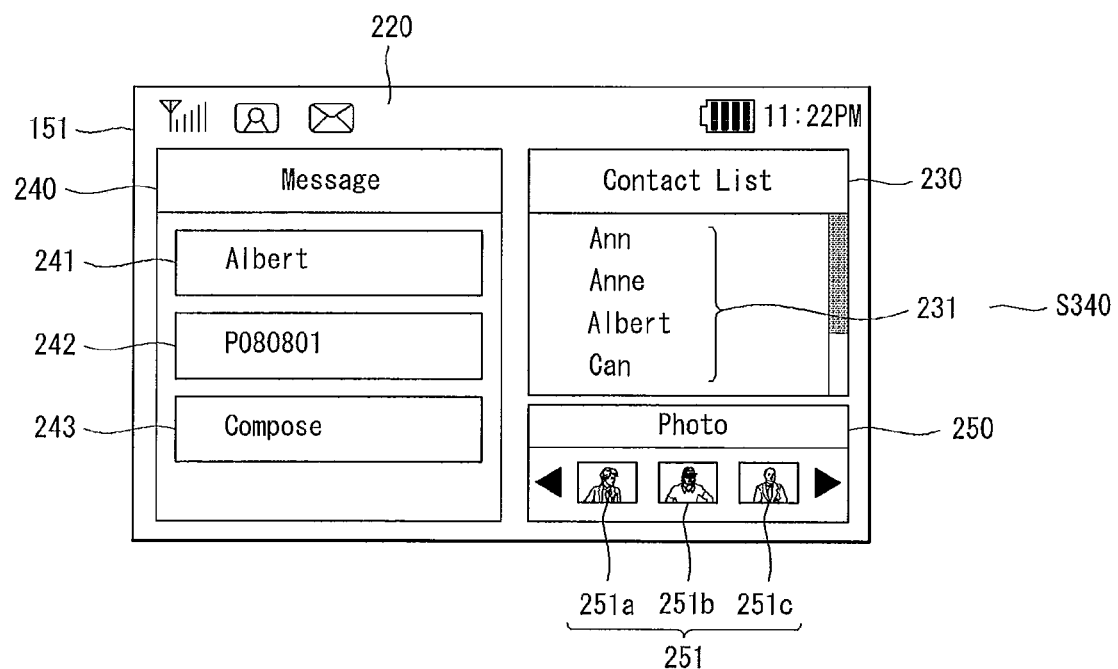

Furthermore, when a specific file dragged-and-dropped to the attachment file field 241 cannot be attached to a message due to a problem in the attribute or size of the specific file, the controller 180 can output a message informing the user of the problem. In addition, the controller 180 attaches the selected file to the message (step S340). For example, as shown in FIG. 11E, a file name "P080801" indicating the selected file is displayed in the attachment file field 242. The user can then compose a message to "Albert" by selecting the compose field 243 and send the message to "Albert."

Figure 12:
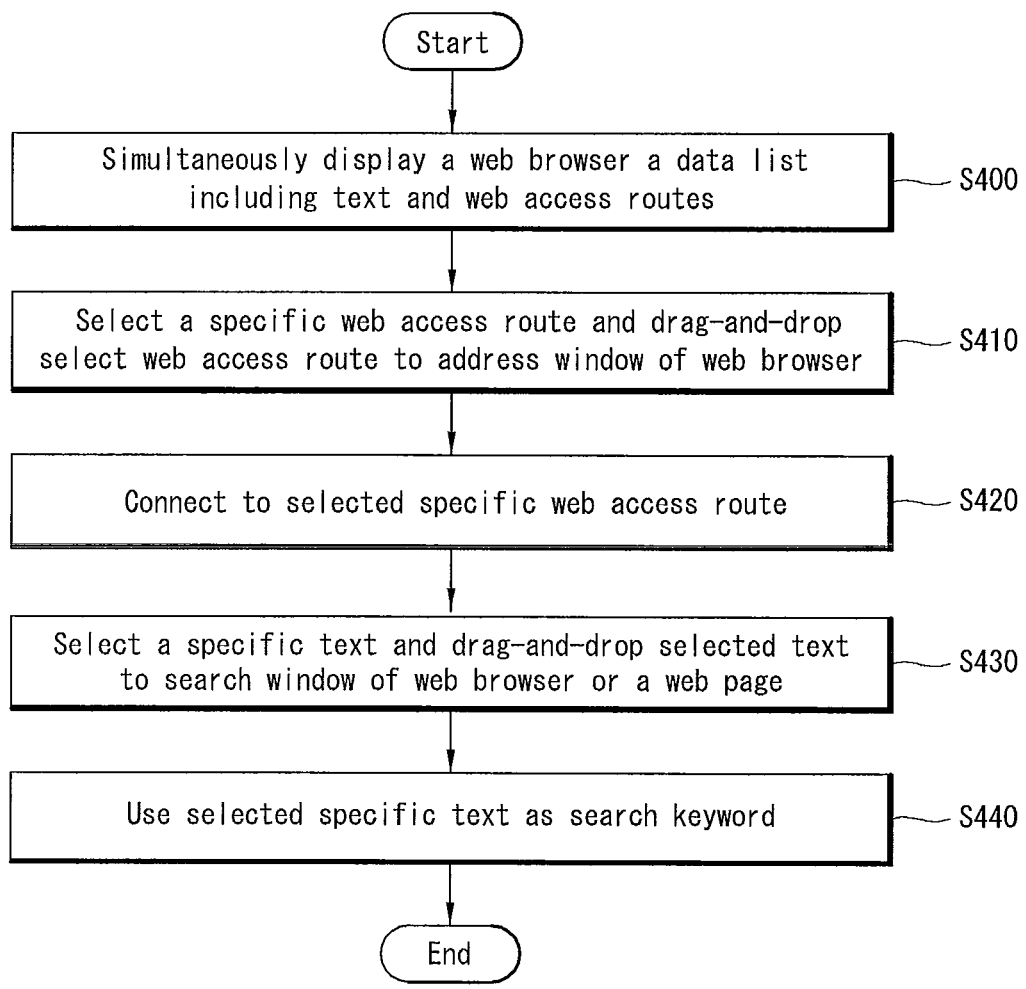
FIG. 12 is a flow chart illustrating a method of processing data in a mobile terminal with a touch screen according to a fourth embodiment of the present invention.

Next, FIG. 12 is a flow chart illustrating a method of processing data in a mobile terminal with a touch screen according to a fourth embodiment of the present invention. In the fourth embodiment, the first application corresponds to a web browser. FIGS. 13A-13E are overviews of display screens illustrating an example to which the present invention is applied in the web browser application.

As shown in FIGS. 12 and 13, the controller 180 simultaneously displays a web browser 260, a text list 271 and a data list 272 including a web connecting route list 272 in predetermined region of a window 220 on the touch screen 151 (step S400). The text list 271 and the web connecting route list 272 can be previously stored by a user or received through the radio communication unit 110 or the interface 170 and are identified by the common reference numeral 270 in FIG. 13.

Figure 13A:
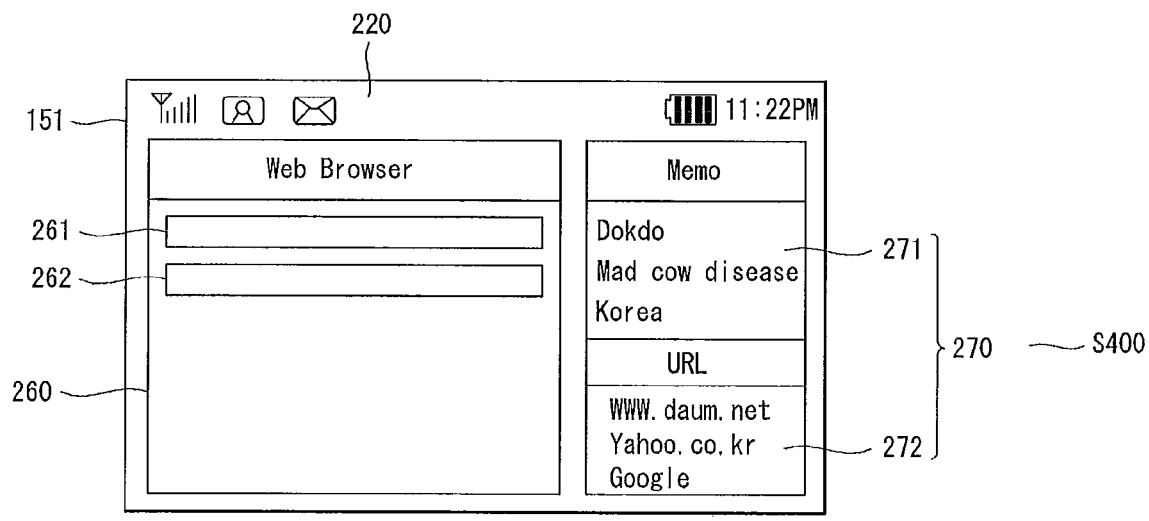
FIGS. 13A-13E are overviews of display screens illustrating an example to which the present invention is applied in a web browsing application.
Figure 13B:
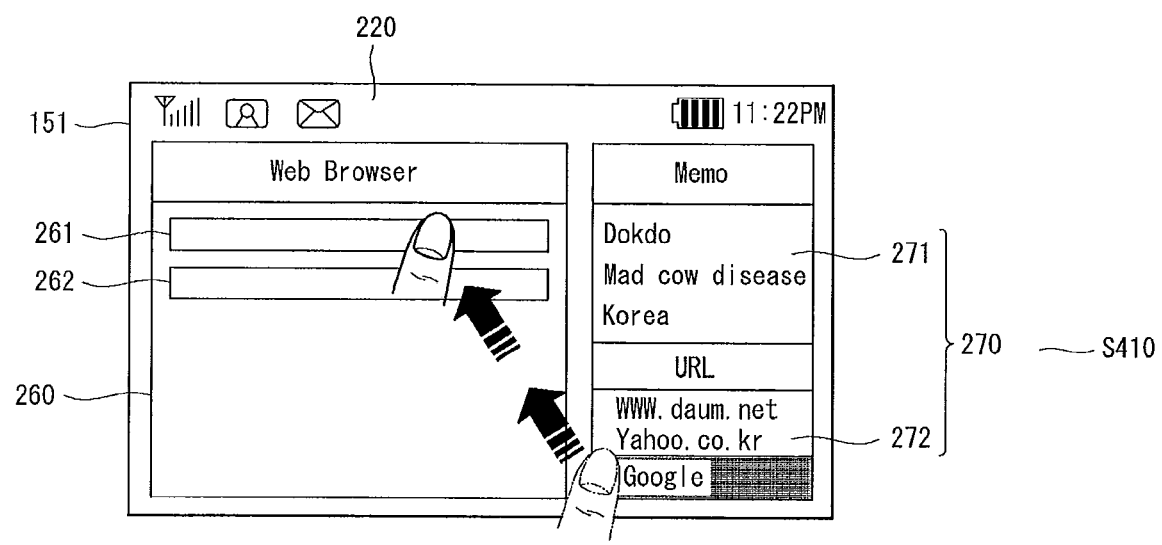

Further, the user selects a specific web connecting route from the web connecting route list 272 and drags-and-drops the selected web connecting route to an address window 261 of the web browser 260 displayed in the window 220 (step S410). For example, as shown in FIG. 13B, the user can touch "Google" in the web connecting route list 272 and drag-and-drop "Google" to the address window 261.

Figure 13C:
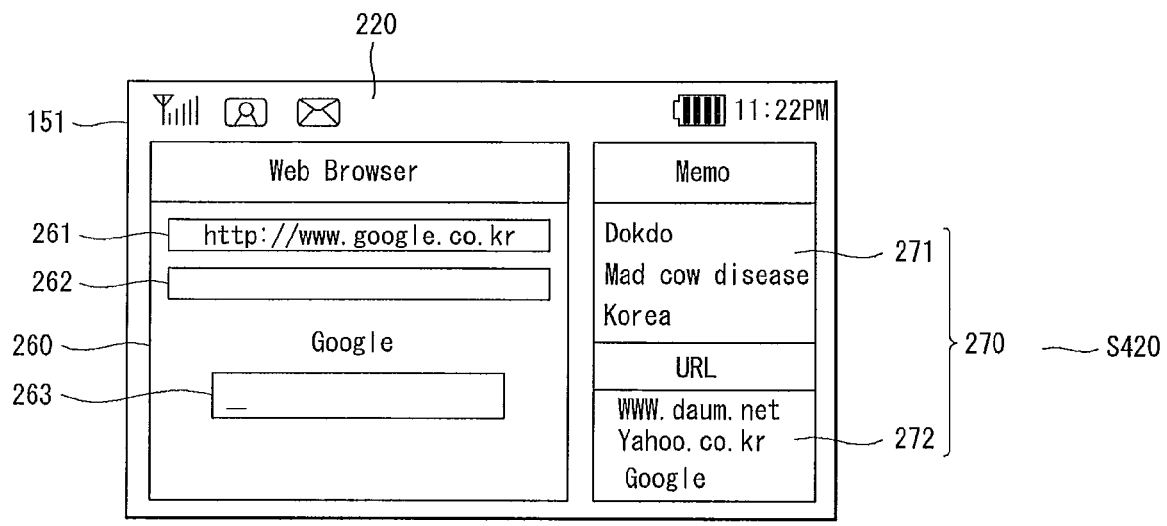

Then, the web browser 260 connects to the selected web connecting route (step S420). Referring to FIG. 13C, the web browser 260 accesses the web site "http://www.google.com" corresponding to "Google" to display a web page provided by "Google" as the user drags-and-drops "Google", for example. The web browser 260 can connect to the selected web connecting route through the wireless Internet module 113.

Figure 13D:
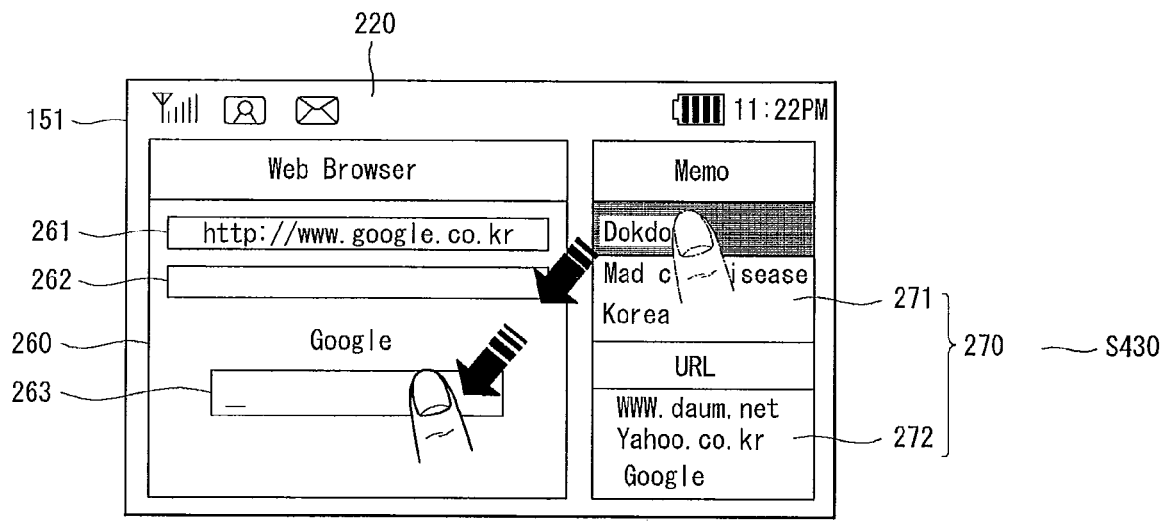

The user then selects a specific text from the text list 271 and drags-and-drops the selected text to a search window 262 of the web browser 260 or a search window 263 provided by the web site connected through the web connecting route (step S430). Referring to FIG. 13D, the user can touch "Dokdo" in the text list 271 and drag-and-drop "Dokdo" to the search window 263 included in the web page provided by "Google", for example.

Figure 13E:
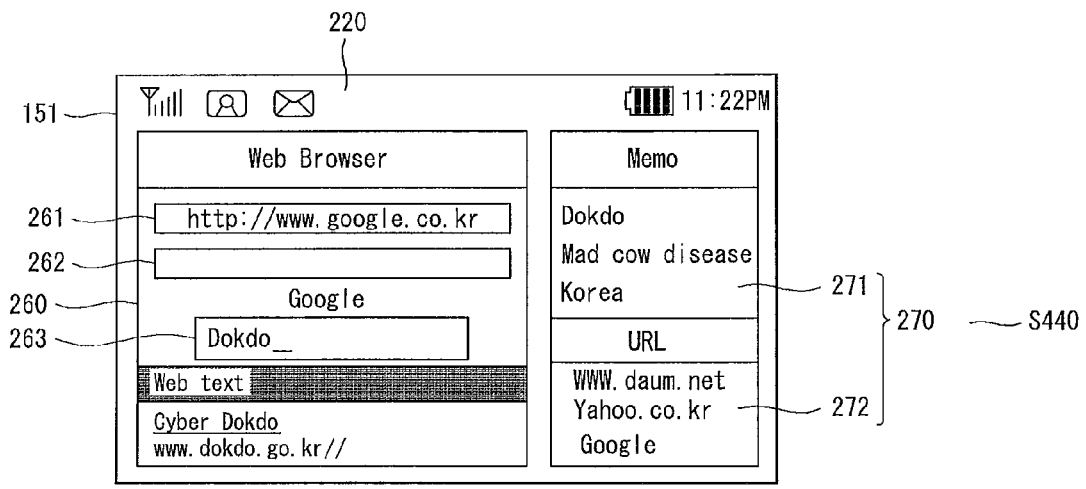

The web browser 260 then uses the selected text as a search keyword for web search (step S440). Referring to FIG. 13E, a web search result obtained by using "Dokdo" as a search keyword in "Google" web pages can be displayed, for example.

Figure 14:
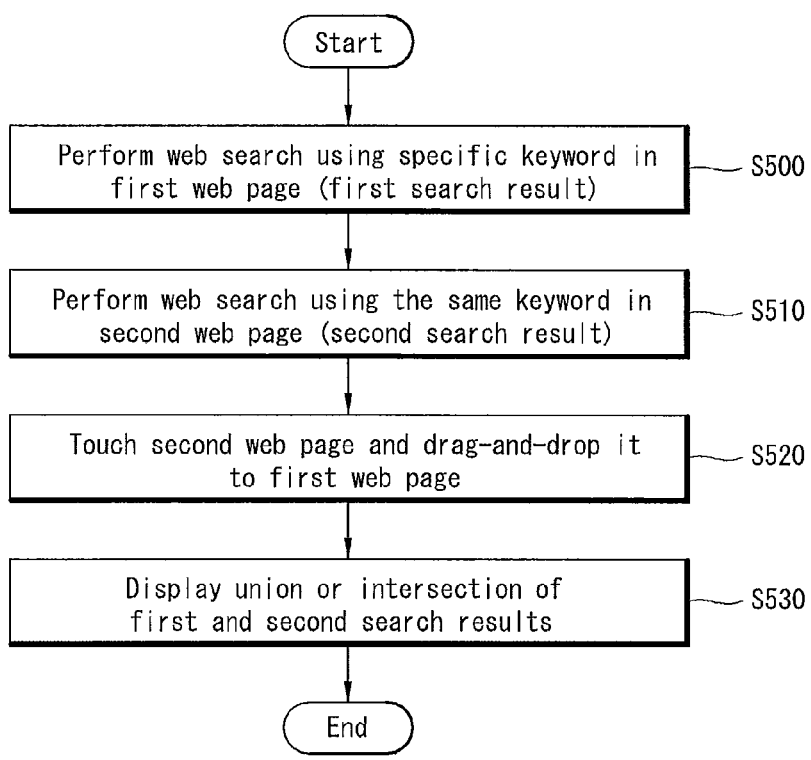
FIG. 14 is a flow chart illustrating a method of processing data in a mobile terminal with a touch screen according to a fifth embodiment of the present invention.

Next, FIG. 14 is a flow chart illustrating a method of processing data in a mobile terminal with a touch screen according to a fifth embodiment of the present invention. The fifth embodiment of the present invention can be applied when a plurality of web pages are displayed. In more detail, FIGS. 15A-15E, 16A and 16B are overviews of display screens illustrating an example to which the present invention is applied for a plurality of web pages.

In this embodiment, the controller 180 controls a web browser to perform web search using a specific keyword in a first web page (step S500), and controls the web browser to execute a web search using the keyword in a second web page (step S510). The search results obtained in steps S500 and S510 are respectively referred to as first and second search results.

Figure 15A:
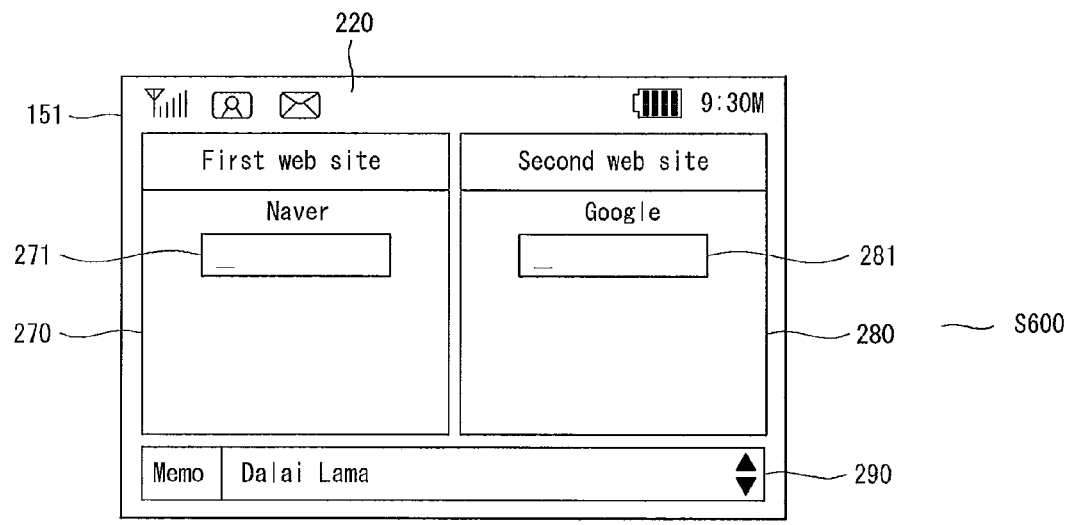
FIGS. 15A-15E, 16A and 16B are overviews of display screens illustrating an example to which the present invention is applied for a plurality of web pages.

In addition, the operations of steps S500 and S510 will now be explained with reference to FIGS. 15A-15E. In more detail, FIG. 15A is an overview of a display screen when a first web site and a second web site are accessed and displayed in the window 220. For example, the first web site provides a display 270 for searching using "Naver" and the second web site provides a display 280 for searching using "Google" (identified also as step S600 in FIG. 15A). Further, as shown, the first web site provides a first search window 271 for performing web search using a search engine provided by the first web site, and the second web site provides a second search window 281 for executing web search using a search engine provided by the second web site.

Figure 15B:
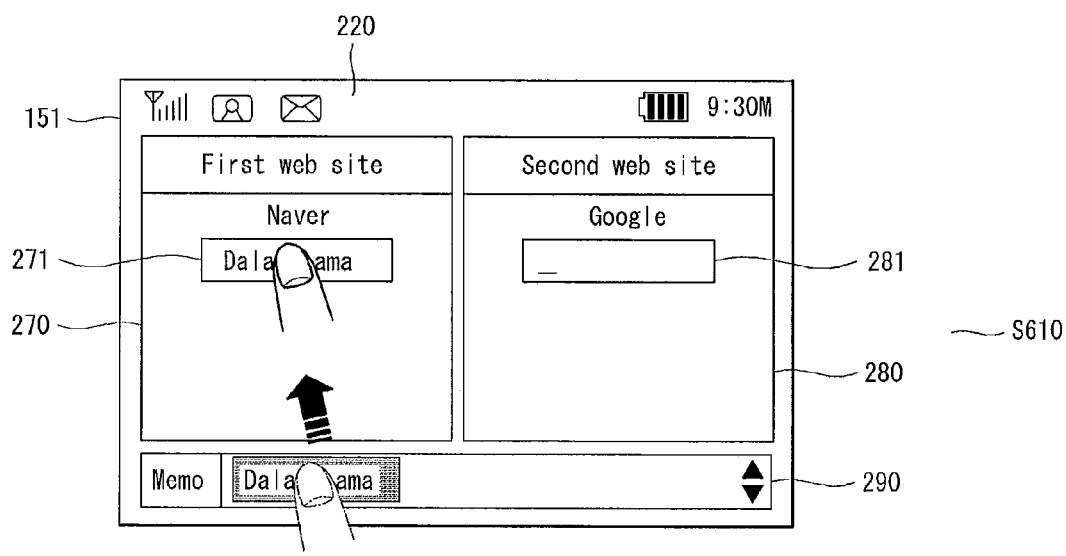
Figure 15C:
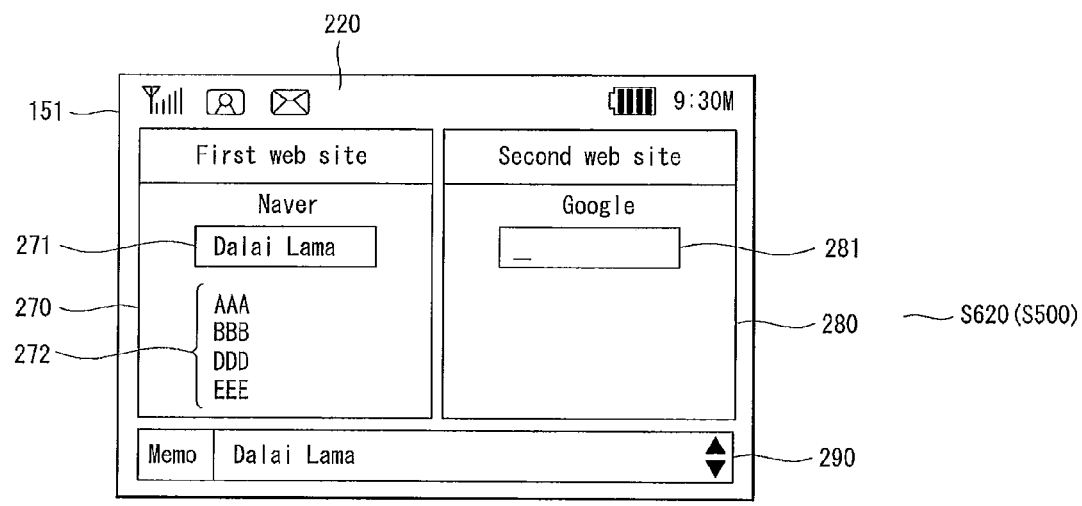

In addition, as shown in FIG. 15A, the touch screen 151 also displays a memo box 290 in which a text list including at least one text that can be used as a search keyword. Thus, as shown in FIG. 15B, when a user touches the text "Dalai-Lama" in the memo box 290 and drags-and-drops the text "Dalai-Lama" to the first search window 271 (identified also as step S610 in FIG. 15B), the first web site performs web search using the text "Dalai-Lama" as a keyword and provides the first search result 272 (corresponding to S500 of FIG. 14), as shown in FIG. 15C (identified also as in steps S620 in FIG. 15C).

Figure 15D:
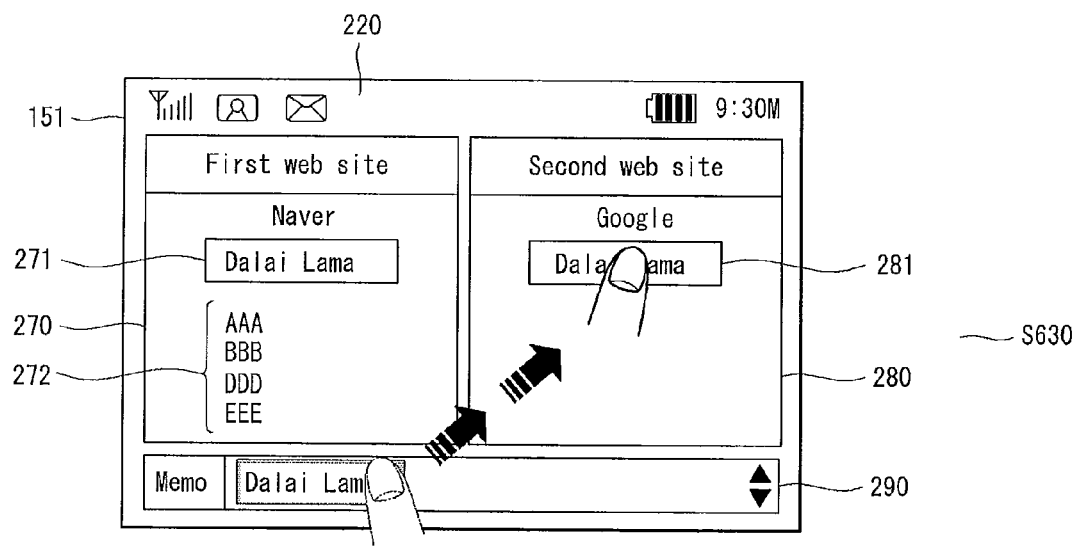
Figure 15E:
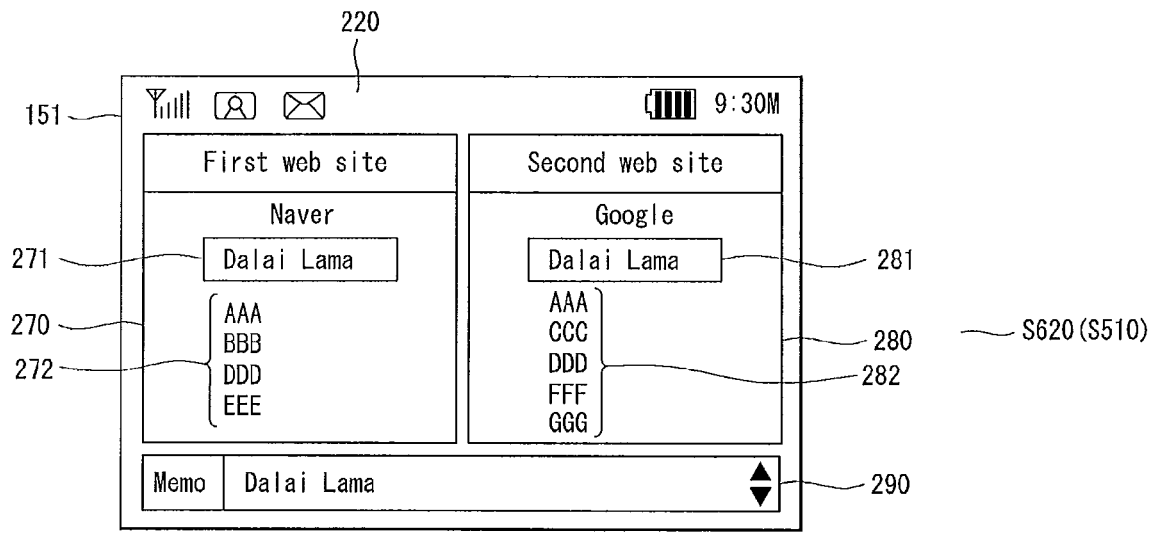

In addition, as shown in FIG. 15D, when the user touches the text "Dalai-Lama" and drags-and-drops the text "Dalai-Lama" to the second search window 281 (identified also as step S630 in FIG. 15D), the second web site performs web search using the text "Dalai-Lama" as a keyword and provides the second search result 282 as shown in FIG. 15E (corresponding to S510 of FIG. 14 and also identified as step S620 in FIG. 15E).

Figure 16A:
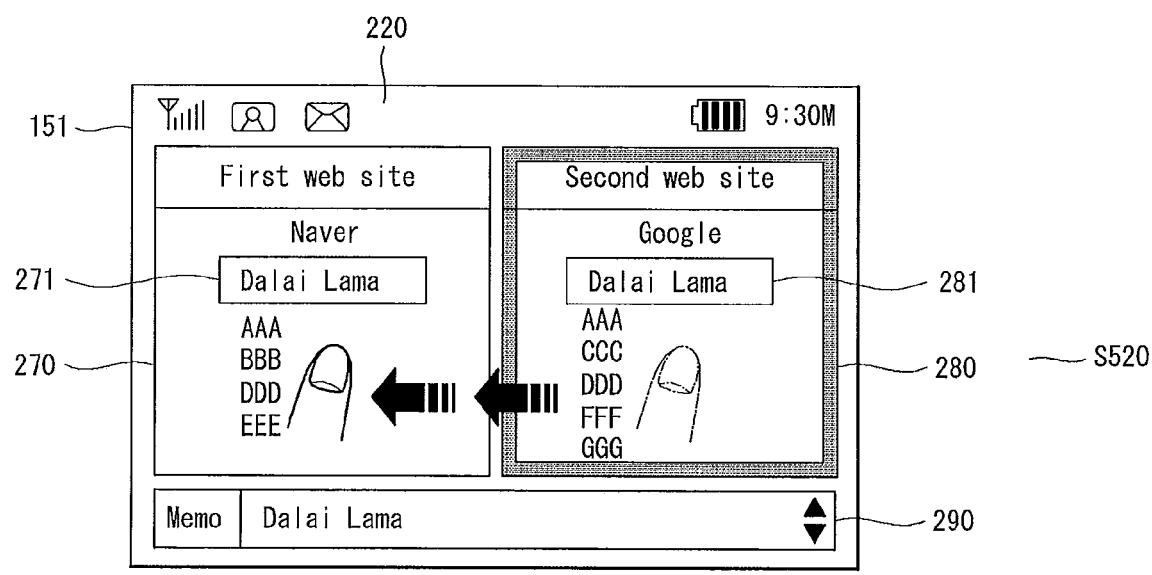

Further, in this example, the first web site and the second web site use different search engines. Accordingly, the first search result 272 and the second search result 282 can be different from each other. When the user touches the region where the second web page is displayed and drags-and-drops the touched region to the region where the first web page is displayed (step S520 in FIG. 14), the controller 180 displays the union or intersection of the first search result 272 and the second search result 282 on the touch screen 151 (step S530) as shown in FIG. 16A. In addition, the union corresponds to the sum of the first search result 272 and the second search result 282 and the intersection corresponds to common results in the first search result 272 and the second search result 282.

Figure 16B:
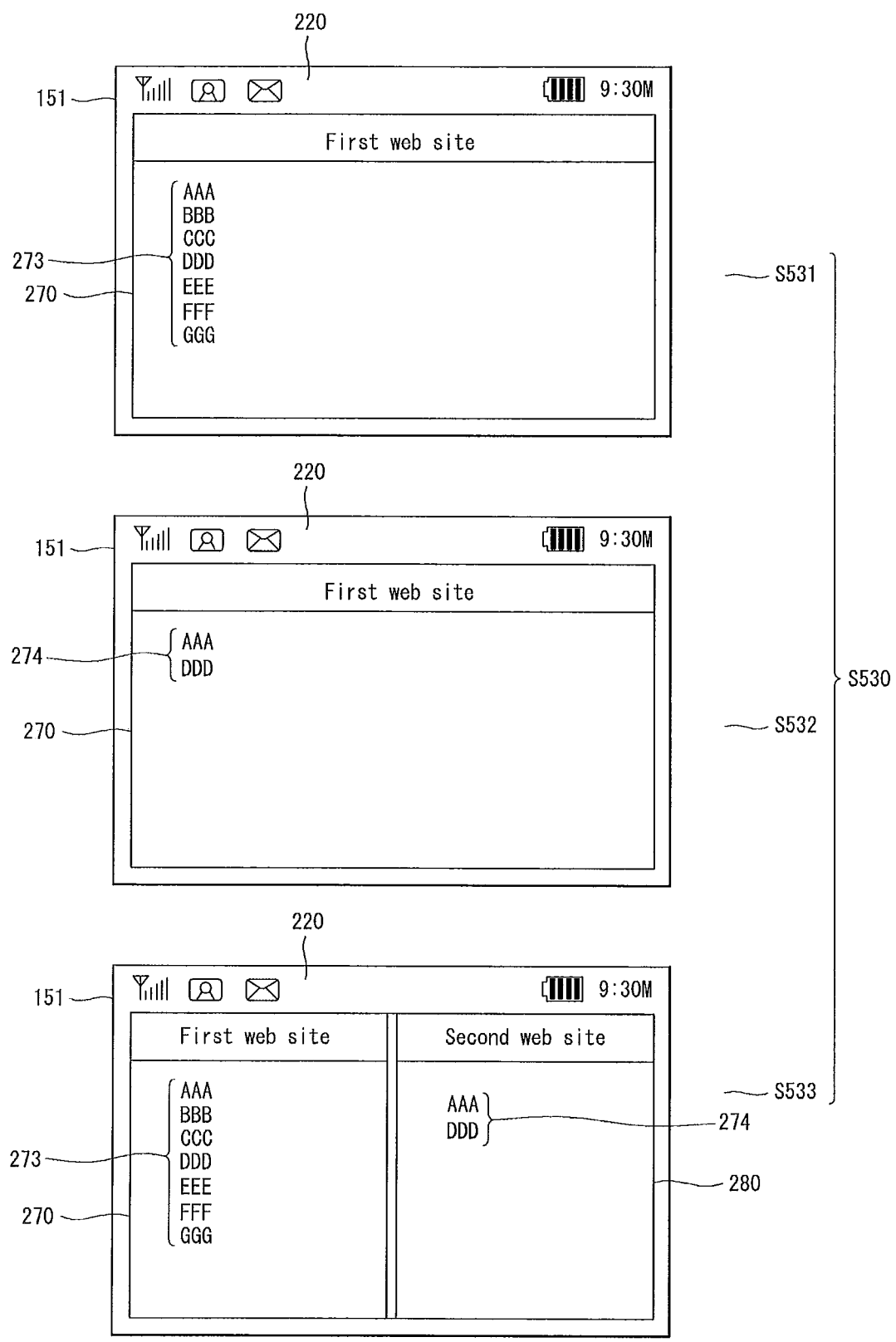

In more detail, FIG. 16B shows the operation of step S530. That is, the controller 180 can display the union 273 of the first search result 272 and the second search result 282 in the region 270 where the first web page is displayed (identified also as step S531 in FIG. 16B). Furthermore, the controller 180 can display the intersection 274 of the first search result 272 and the second search result 282 in the region 270 where the first web page is displayed (identified also as step S532 in FIG. 16B).

The union 273 or the intersection 274 can be displayed in the region 280 where the second web page is displayed or a predetermined region of the touch screen 151. Moreover, the controller 180 can display the union 273 in the region 270 where the first web page is displayed and display the intersection 274 in the region 280 where the second web page (identified also as step S533 in FIG. 16B).

Figure 17:
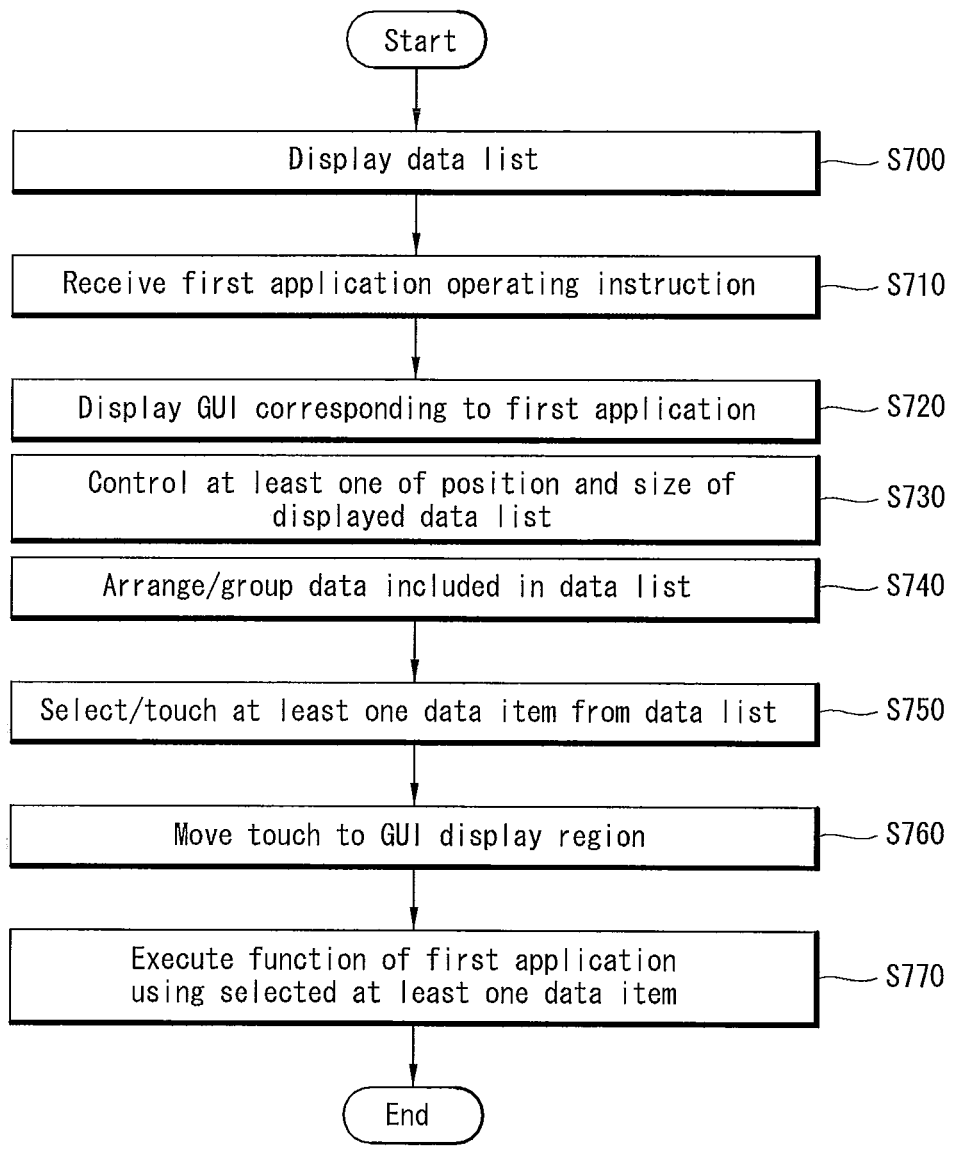
FIG. 17 is a flow chart illustrating a method of processing data in a mobile terminal with a touch screen according to a sixth embodiment of the present invention.
Figure 18:
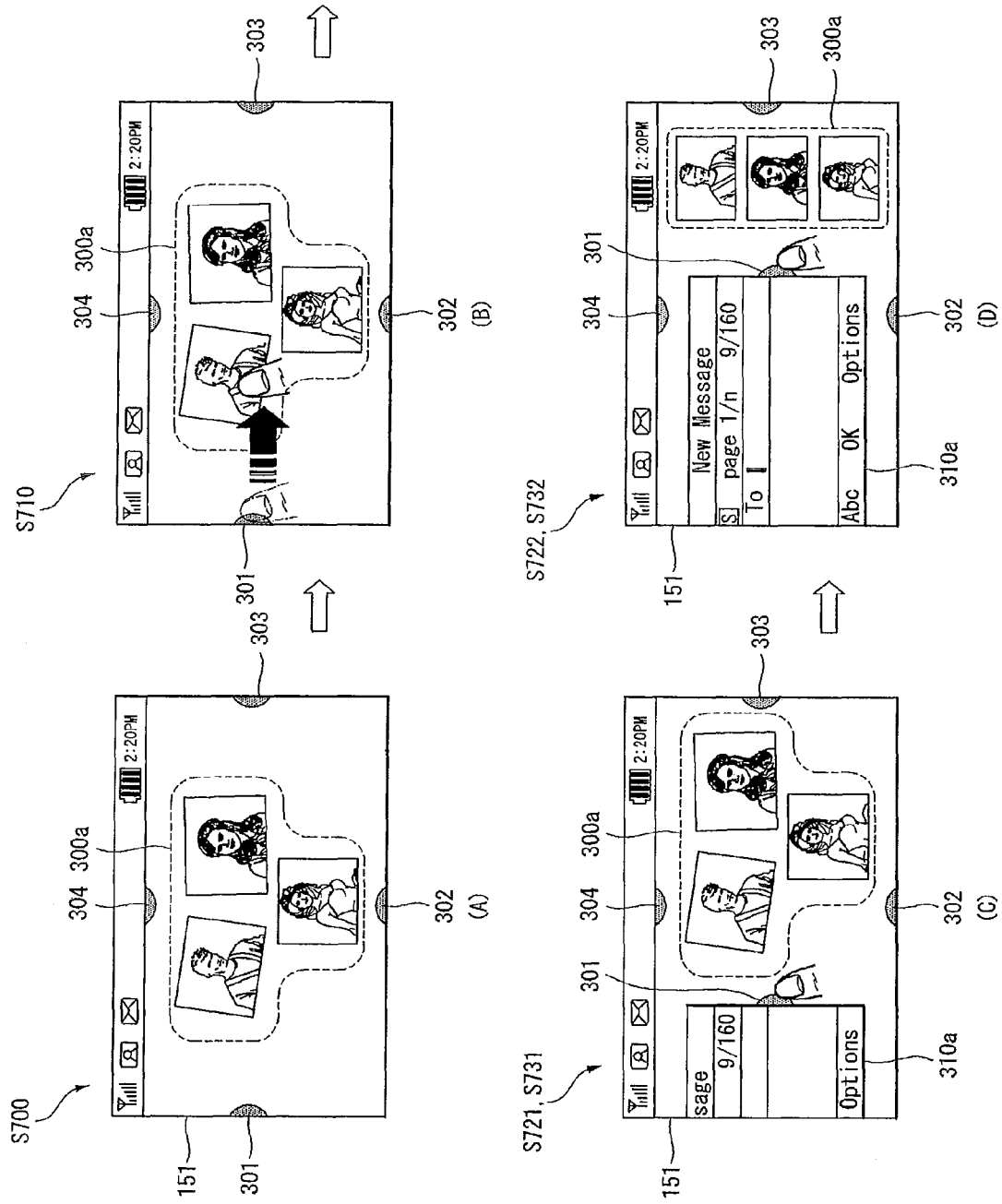
FIGS. 18-20 are overviews of display screens illustrating images displayed according to the method of processing data in accordance with an embodiment of the present invention.
Figure 19:
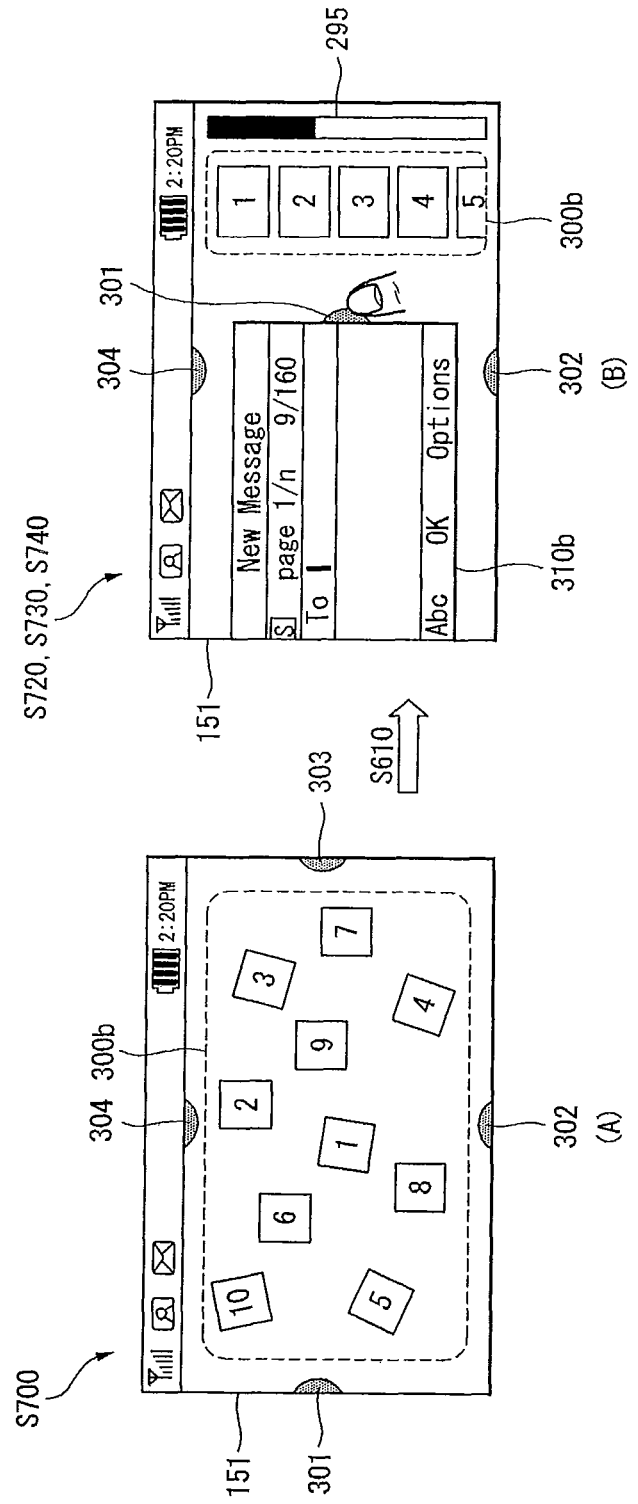
Figure 20:
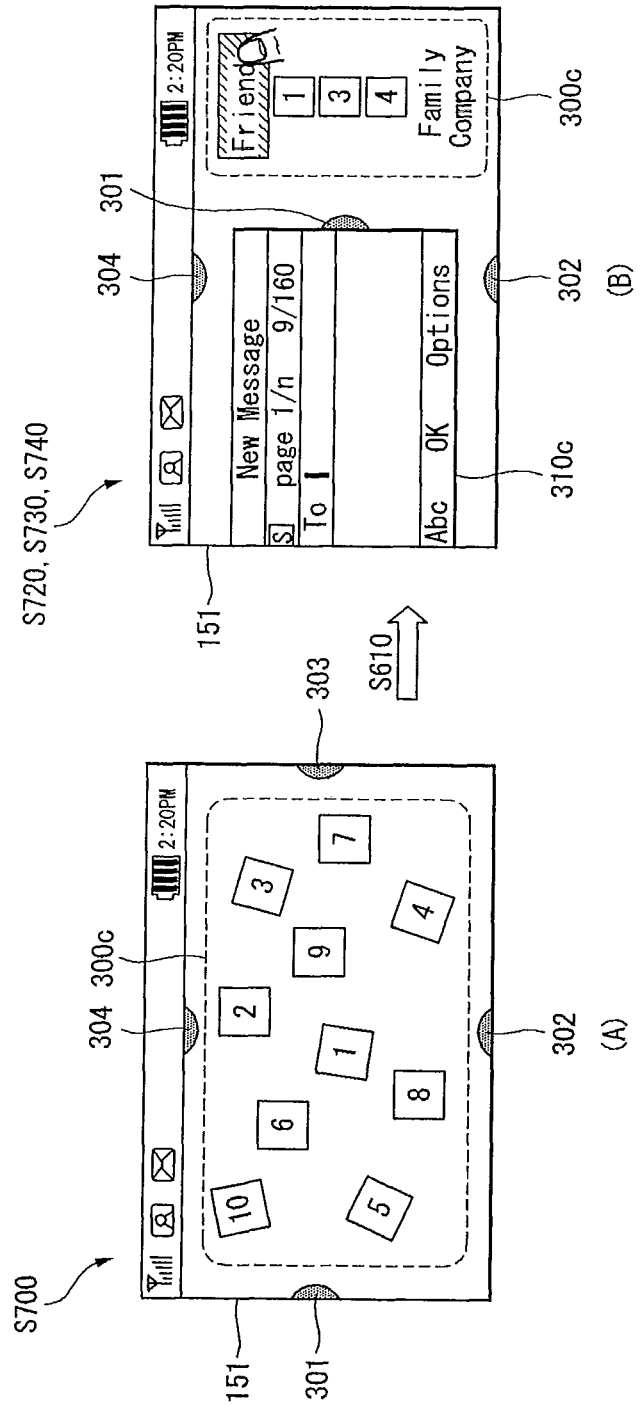

Next, FIG. 17 is a flow chart illustrating a method of processing data in a mobile terminal according to a sixth embodiment of the present invention. The sixth embodiment of the present invention can be applied to all the aforementioned embodiments. Further, FIGS. 18, 19 and 20 are overviews of display screens illustrating example images displayed according to the sixth embodiment of the present invention.

As shown in FIGS. 17-20, the controller 180 displays a data list including at least one data item on the touch screen 151 (step S700). The data list has been described in detail in the first embodiment of the present invention. For example, as illustrated in FIG. 18A, the controller 180 can display a phonebook data list 300a on the touch screen 151. Other types of lists can also be displayed as discussed above with respect to the other embodiments.

Then, in FIG. 17, the controller 180 receives a first application operating instruction (step S710). The step S710 can be performed in various manners. For example, a messaging application operating instruction can be transmitted to the controller 180 in such a manner that the user touches the icon 301 representing the messaging application and starts to drag the touched icon 301 to the center of the screen, as illustrated in FIGS. 18A and 18B.

The controller 180 also displays a graphic user interface (GUI) 310a (FIGS. 18C and 18D) corresponding to the first application on a predetermined portion of the touch screen 151 when the first application operating instruction is received (step S720). The controller 180 also controls at least one of the position and size of the displayed data list 300a such that the region where the GUI 310a is displayed and the region where the data list 300a is displayed are not overlapped with each other (step S730).

For example, when the user touches the icon 301 and drags the touched icon 301 to the right, the list 300a is scrolled and displayed on the touch screen 151, as illustrated in FIGS. 18C and 18D, such that the list 300a does not overlap with the GUI 310a. This embodiment differs from the embodiment shown in FIG. 6, in which the region where the phonebook data list 300 is displayed is fixed and thus the region where the messaging application 310 is displayed and the region where the phonebook data list 300 is displayed are overlapped with each other. However, according to the sixth embodiment of the present invention, the controller 180 can control at least one of the position and size of the displayed phonebook data list 300a such that the region where the GUI 310a corresponding to the messaging application is displayed and the region where the phonebook data list 300a is displayed are not overlapped with each other, as illustrated in FIGS. 18A-18D.

In more detail, and referring to FIG. 18C, when the GUI 310a corresponding to the messaging application is displayed in a small region, only the position of the displayed phonebook data list 300a can be changed without varying the size of the displayed phonebook data list 300a (identified also as steps S721 and S731). As shown in FIG. 18D, when the GUI 310a corresponding to the messaging application is displayed in a wide region, both the position and size of the displayed phonebook data list 300a can be changed (identified also as steps S722 and S732).

Thus, as shown in FIG. 17, the controller 180 can arrange at least one data item included in the data list according to a predetermined standard when the GUI corresponding to the first application is displayed (step S740). In addition, the controller 180 can group at least one data item included in the data list into a plurality of categories.

For example, as shown in FIGS. 19A and 19B, the controller 180 can arrange data included in the phonebook data list 300b according to a predetermined standard when the GUI 310a corresponding to the messaging application is displayed. In addition, in FIG. 19, numerals representing phonebook data are indicated for explaining the displaying of phonebook data.

In addition, the predetermined standard can include a variety of standards. For example, the controller 180 can arrange the phonebook data included in the phonebook data list 300b according to the frequency of using the phonebook data item included in the phonebook data list 300b, whether the phonebook data has been used recently or the category to which the phonebook data belongs.

In addition, when the arranged phonebook data cannot be displayed in a single image, the scroll bar 295 can be provided to the touch screen 151, as illustrated in FIG. 19B. The user can then access phonebook data that is not displayed using the scroll bar 295. FIG. 19A is also identified by the step S710 and FIG. 19B is identified by the steps S720, S730 and S740.

In addition, referring to FIGS. 20A and 20B, the controller 180 can group the phonebook data included in the phonebook data list 300c into a plurality of categories when the GUI 310c corresponding to the messaging application is displayed. In more detail, FIGS. 20A and 20B illustrate that the phonebook data included in the phonebook data list 300c is grouped into three categories including "friend", "family" and "company".

Thus, when the user selects a specific category, only the data included in the selected specific category can be displayed on the touch screen 151. FIG. 20B illustrates that the user selected the category "friend" and thus the phonebook data included in the category "friend" is displayed. In addition, the operations of arranging and grouping the data list are not limited to the examples illustrated in FIGS. 19 and 20 and can be performed in various manners. FIG. 20A is also identified by the step S700 and FIG. 20B is identified by the steps S720, S730 and S740.

In addition, as shown in FIG. 17, the controller 180 can receive a signal for selecting at least one data item included in the data list (step S750). The step S750 can correspond to the step S110 of FIG. 5. Further, the controller 180 can detect that touch of the selected at least one data item is moved to the region where the GUI corresponding to the first application is displayed (step S760). The step S760 can correspond to the step S120 of FIG. 5.

Also, the controller 180 can execute the first application using the selected at least one data item in response to the touch and move (step S770), which can correspond to the step S130 of FIG. 5. In addition, the steps S750, S760 and S770 are identical to corresponding steps in the aforementioned embodiments and thus detailed explanations thereof are omitted.

In addition, in FIGS. 18-20, the controller 180 can assign a higher priority to data items related to the first application among the plurality of data items such that the higher priority data items are displayed more discriminately than the other data items. Thus, as the user is dragging the icon 301 towards the center of the screen, the controller 180 begins to unravel or expand a size of a graphic user interface corresponding to the first application, and also rearranges the items in the items list 300a according to a priority. For example, if the item list 300a included a plurality of items for different applications, the controller 180 would distinctively display items that are related to the first application from items that are related to a second or other applications.

The above described data processing method in a mobile terminal with a touch screen according to the present invention can be written as computer programs and can be implemented in digital computers that execute the programs using a computer readable recording medium. The data processing method in a mobile terminal with a touch screen according to embodiments of the present invention can be executed through software. The software can include code segments that perform required tasks. Programs or code segments can also be stored in a processor readable medium and transmitted.

The computer readable recording medium includes all types of recording devices storing data readable by computer systems. Examples of the computer readable recording medium include ROM, RAM, CD-ROM, DVD±ROM, DVD-RAM, magnetic tapes, floppy disks, hard disks, and optical data storage devices. The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
displaying a data list including a plurality of data items and a plurality of icons representing different applications in a display window of a touch screen of the mobile terminal,
wherein each of the icons is contiguous to a corresponding edge line of the display window, each of the different applications performs a plurality of functions using the data items, and a managing application of the data items is different from the each of the different applications;
selecting a specific icon from among the icons based on a touch operation received through the specific icon;
slidingly displaying an execution screen of a specific application corresponding to the specific icon, from an edge line corresponding to the specific icon to the center of the display window, based on a drag operation in a direction to the center of the display window continuously received following the touch operation received on the specific icon,
wherein an area of the execution screen is increased according to an increase of a distance of the drag operation;
controlling at least positions or sizes of the data items such that the execution screen and a region including the data items are not overlapped with each other according to the increase of the area of the execution screen,
wherein the positions of the data items are determined based on use states of the data items in the managing application;
selecting a specific data item from the data list based on a touch operation on the specific data item; and
executing the specific application using the selected specific data item based on a drag and drop operation continuously received following the touch operation received on the selected specific data item.

2. The method of claim 1, wherein the specific application corresponds to one of a video telephony application, a message transmission application and a web browsing application, and the data list relates to at least one of text, still images, moving images, a phonebook and web connecting routes.

3. The method of claim 2, wherein when the specific application corresponds to the video telephony application, the executing step comprises:
transmitting the selected specific data item to a recipient party included in the video telephony application.

4. The method of claim 2, wherein when the specific application corresponds to the message transmission application, the executing step comprises:
inserting the selected specific data item into an appropriate field corresponding to the selected specific data item included in the specific application for the message transmission application.

5. The method of claim 2, wherein when the specific application corresponds to the web browsing application and the selected specific data is a web connecting route, the executing step comprises:
automatically executing a web page corresponding to the web connecting route in the specific application for the web browser application.

6. The method of claim 1, wherein the executing of the function further comprises zooming in or zooming out the specific application.

7. A mobile terminal, comprising:
a display unit; and
a controller configured to:
control the display unit to display a data list including a plurality of data items and a plurality of icons representing different applications in a display window of a touch screen of the mobile terminal,
wherein each of the icons is contiguous to a corresponding edge line of the display window, each of the different applications performs a plurality of functions using the data items, and a managing application of the data items is different from the each of the different applications,
select a specific icon from among the icons based on a touch operation received through the specific icon,
control the display unit to slidingly display an execution screen of a specific application corresponding to the specific icon, from an edge line corresponding to the specific icon to the center of the display window, based on a drag operation in a direction to the center of the display window continuously received following the touch operation received on the specific icon, wherein an area of the execution screen is increased according to an increase of a distance of the drag operation;

control at least positions or sizes of the data items such that the execution screen and a region including the data items are not overlapped with each other according to the increase of the area of the execution screen, wherein the positions of the data items are determined based on use states of the data items in the managing application, select a specific data item from the data list based on a touch operation on the specific data item, and execute the specific application using the selected specific data item based on a drag and drop operation continuously received following the touch operation received on the selected specific data item.

8. The mobile terminal of claim 7, wherein the specific application corresponds to one of a video telephony application, a message transmission application and a web browsing application, and the data list relates to at least one of text, still images, moving images, a phonebook and web connecting routes.

9. The mobile terminal of claim 8, wherein when the specific application corresponds to the video telephony application, the controller is configured to transmit the dragged and dropped selected specific data item to a recipient party included in the video telephony application.

10. The mobile terminal of claim 8, wherein when the specific application corresponds to the message transmission application, the controller is configured to insert the dragged and dropped selected specific data item into an appropriate field corresponding to the selected specific data item included in the specific application for the message transmission application.

11. The mobile terminal of claim 8, wherein when the specific application corresponds to the web browsing application and the selected specific data item is a web connecting route, the controller is configured to automatically execute a web page corresponding to the web connecting route in the specific application for the web browser application.

12. The mobile terminal of claim 7, wherein when the controller executes the function, the controller is further configured to zoom in or zoom out the specific application.

\* \* \* \* \*